(12) United States Patent
Murakami et al.

(10) Patent No.: US 11,383,493 B2
(45) Date of Patent: Jul. 12, 2022

(54) WINDOW FILM

(71) Applicant: DAI NIPPON PRINTING CO., LTD., Tokyo-to (JP)

(72) Inventors: Keiichi Murakami, Tokyo-to (JP); Masato Idegami, Tokyo-to (JP); Anri Takarabe, Tokyo-to (JP); Shingo Namatame, Tokyo-to (JP); Masahiro Tatsuzawa, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 144 days.

(21) Appl. No.: 15/039,337

(22) PCT Filed: Nov. 10, 2014

(86) PCT No.: PCT/JP2014/079739
§ 371 (c)(1),
(2) Date: May 25, 2016

(87) PCT Pub. No.: WO2015/079897
PCT Pub. Date: Jun. 4, 2015

(65) Prior Publication Data
US 2017/0165947 A1 Jun. 15, 2017

(30) Foreign Application Priority Data

Nov. 26, 2013 (JP) .............................. JP2013-244235
Sep. 30, 2014 (JP) .............................. JP2014-199829

(51) Int. Cl.
*B32B 17/10* (2006.01)
*G02B 5/20* (2006.01)
(Continued)

(52) U.S. Cl.
CPC .......... *B32B 17/10779* (2013.01); *B32B 3/30* (2013.01); *B32B 7/12* (2013.01);
(Continued)

(58) Field of Classification Search
CPC .......... G02B 5/22; G02B 5/045; G02B 5/208; G02B 5/003; G02B 5/0231; G02B 5/04;
(Continued)

(56) References Cited

U.S. PATENT DOCUMENTS 6,030,671 A * 2/2000 Yang ................. B32B 17/10009
359/354
6,166,852 A * 12/2000 Miro ................. B32B 17/10009
359/361

(Continued)

FOREIGN PATENT DOCUMENTS

JP 4881208 B 2/2012
JP 2013-158970 8/2013
(Continued)

OTHER PUBLICATIONS

Endo, et al., "Newly Revised—Plastic Containing Agent—Basic and Advanced", 1st edition, Taiseisha Ltd., Nov. 30, 1996, p. 108 with a partial Engish translation.
(Continued)

*Primary Examiner* — Catherine A. Simone
(74) *Attorney, Agent, or Firm* — Hamre, Schumann, Mueller & Larson, P.C.

(57) ABSTRACT

A window film including at least a first adhesive layer containing a weathering agent, a barrier layer, a second adhesive layer, and a light control layer in this order.

11 Claims, 2 Drawing Sheets

(51) Int. Cl.
 B32B 27/36 (2006.01)
 B32B 27/18 (2006.01)
 C09J 7/22 (2018.01)
 C09J 7/38 (2018.01)
 B32B 3/30 (2006.01)
 B32B 7/12 (2006.01)
 B32B 27/08 (2006.01)
 B32B 27/30 (2006.01)
 B32B 27/38 (2006.01)
 B32B 27/40 (2006.01)
 E06B 3/30 (2006.01)
 E06B 9/24 (2006.01)
 G02B 5/04 (2006.01)
 C08K 5/00 (2006.01)

(52) U.S. Cl.
 CPC .............. *B32B 27/08* (2013.01); *B32B 27/18* (2013.01); *B32B 27/308* (2013.01); *B32B 27/36* (2013.01); *B32B 27/38* (2013.01); *B32B 27/40* (2013.01); *C09J 7/22* (2018.01); *C09J 7/38* (2018.01); *E06B 3/30* (2013.01); *E06B 9/24* (2013.01); *G02B 5/045* (2013.01); *G02B 5/208* (2013.01); *B32B 2255/10* (2013.01); *B32B 2255/26* (2013.01); *B32B 2264/12* (2013.01); *B32B 2307/412* (2013.01); *B32B 2307/416* (2013.01); *B32B 2307/712* (2013.01); *B32B 2419/00* (2013.01); *B32B 2605/006* (2013.01); *B32B 2605/08* (2013.01); *C08K 5/005* (2013.01); *C09J 2301/162* (2020.08); *C09J 2301/302* (2020.08); *C09J 2301/312* (2020.08); *C09J 2301/408* (2020.08); *C09J 2301/41* (2020.08); *C09J 2400/22* (2013.01); *C09J 2433/00* (2013.01); *C09J 2433/006* (2013.01); *C09J 2467/006* (2013.01); *C09J 2475/006* (2013.01); *E06B 2009/2405* (2013.01); *E06B 2009/2417* (2013.01); *G02B 2207/123* (2013.01)

(58) Field of Classification Search
 CPC .............. G02B 27/30; G02B 2207/123; G02B 6/0053; G02B 5/201; G02B 5/26; E06B 9/24; E06B 2009/2405; E06B 2009/2417; E06B 9/386; E06B 9/388; E06B 3/30; Y10T 428/28; Y10T 428/2809; Y10T 428/2848; C09J 7/22; C09J 7/29; C09J 7/38; C09J 2301/312; C09J 2301/41; C09J 2301/408; C09J 2301/162; C09J 2301/302; C09J 2400/22; C09J 2433/00; C09J 2433/006; C09J 2467/006; C09J 2475/006; B32B 7/12; B32B 3/30; B32B 17/10779; B32B 27/08; B32B 27/18; B32B 27/308; B32B 27/36; B32B 27/38; B32B 27/40; B32B 2255/10; B32B 2255/26; B32B 2264/12; B32B 2307/412; B32B 2307/416; B32B 2307/712; B32B 2419/00; B32B 2605/006; B32B 2605/08; C08K 5/005
 See application file for complete search history.

(56) References Cited

U.S. PATENT DOCUMENTS

2008/0291541 A1\* 11/2008 Padiyath ................ G02B 5/045
 359/569
2010/0112347 A1 5/2010 Matsushita et al.
2010/0271721 A1\* 10/2010 Gaides .................. G02B 5/045
 359/885

FOREIGN PATENT DOCUMENTS

WO WO-2013036386 A1 \* 3/2013 ............ B32B 27/08
WO 2013/141375 9/2013

OTHER PUBLICATIONS

International Search Report issued in International Application No. PCT/JP2014/079739, Feb. 3, 2003, 2 pages.

\* cited by examiner

WINDOW FILM

TECHNICAL FIELD

The present disclosure relates to a window film with excellent weatherability and durability.

BACKGROUND ART

In recent years, as environmental issues such as global warming are getting more serious, spatial temperature adjustment for houses and automobiles, in which a window film having alight control layer is utilized, has been advanced for the purpose of energy saving or $CO_2$ reduction.

The window film is a functional sheet which adjusts an incident amount of heat rays and visible light rays to the inside of a room by selectively absorbing, polarizing, reflecting, or transmitting light according to an incident angle of external light such as solar light.

The window film generally includes a light control layer and an adhesive layer for pasting the light control layer to an adhered body such as a window glass. Herein, since the light control layer exerts the aforementioned function according to the shape thereof, it is required to be formed by using a material which has high formability and is less likely to be deformed over time. In addition, in order to improve illuminance in a room and improve room temperature by utilizing external light, it is necessary to allow larger quantity of light to enter inside a room, and thus the light control layer is also required to have a high light transmittance. For this reason, as the material of the light control layer, an ionizing radiation curable resin is considered suitable. However, a phenyl group or an unreacted polymerizable unsaturated bond in the structure of the ionizing radiation curable resin easily absorbs an ultraviolet ray of external light, and thus the light control layer has a drawback that optical deterioration easily occurs. On the other hand, when a weathering agent such as an ultraviolet absorbent or a photooxidation inhibitor is contained in order to prevent deterioration of the light control layer, since an ultraviolet ray necessary for curing the resin at the time of molding the light control layer is absorbed by the weathering agent so that curing reaction is inhibited, a problem arises in which the light control layer is difficult to mold in a desired shape.

In this regard, in a window film to be pasted to the inner side of, for example, a window glass with respect to the incident direction of external light, it is attempted to prevent deterioration of the light control layer and improve weatherability of the window film by containing the weathering agent in the adhesive layer so that wavelength light causing deterioration of the light control layer, such as an ultraviolet ray included in external light, is absorbed in the adhesive layer.

Incidentally, Patent Document 1 discloses an adhesive containing a (meth) acrylic acid ester-based copolymer having a carboxyl group, a metal chelate-based cross-linking agent, and a triazine-based ultraviolet absorbent as an adhesive for a window film having high holding power, weatherability, and an ultraviolet ray absorbing capability. In addition, a window film, which includes an adhesive layer containing the above-described composition and a light control layer formed by an ionizing radiation curable resin, is disclosed.

CITATION LIST

Patent Document

Patent Document 1: Japanese Patent No. 4881208

SUMMARY

Technical Problem

However, in such a window film, the content of the weathering agent in the adhesive layer is decreased due to the migration of the weathering agent contained in the adhesive layer to an adjacent layer, so-called bleeding out, and thus deterioration of the adhesive layer itself occurs. As a result, a problem arises in which weatherability and durability as the window film cannot be sufficiently improved.

Incidentally, in the present specification, the term "bleeding out (bleed out)" indicates the migration of the weathering agent contained in the adhesive layer to another adjacent layer and the phenomenon thereof.

The present invention has been made in view of the situation described above, and one of objects thereof is to provide a window film with excellent weatherability and durability.

Solution to Problem

An embodiment of the present invention provides a window film comprising at least a first adhesive layer containing a weathering agent, a barrier layer, a second adhesive layer, and a light control layer laminated in this order.

DESCRIPTION OF EMBODIMENTS

Hereinafter, some embodiments of the present invention will be described in detail.

The window film comprises at least a first adhesive layer containing a weathering agent, a barrier layer, a second adhesive layer, and a light control layer are laminated in this order.

Figure 1:
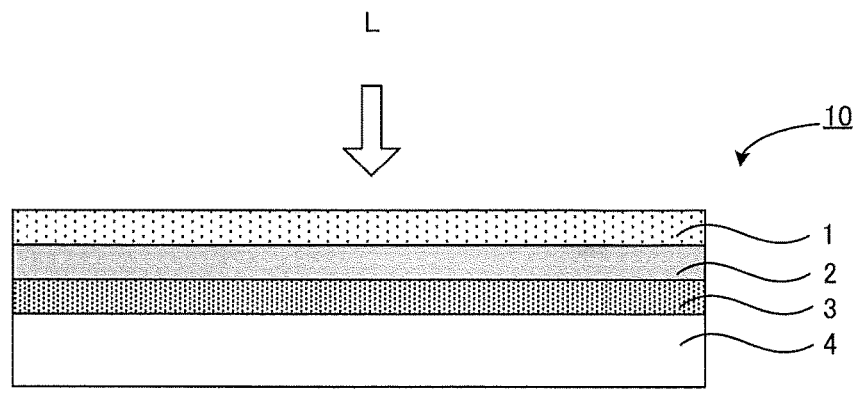
FIG. 1 is a schematic sectional view illustrating an example of a window film.

The window film will be described with reference to the drawing. FIG. 1 is a schematic sectional view illustrating an example of the window film. A window film 10 comprises at least a first adhesive layer 1 containing a weathering agent, a barrier layer 2, a second adhesive layer 3, and a light control layer 4 laminated in this order. The window film 10 is usually pasted on an adhered body such as a window glass in such a manner that the first adhesive layer 1 is disposed at a light source side of external light (an L direction in FIG. 1) in relation to the light control layer 4.

As described above, in order to obtain high formability and a high light transmissive property of the light control layer in a window film by which external light can be selectively allowed to enter inside a room, it has been considered to attempt to absorb ultraviolet rays, for example, in the adhesive layer in advance so as to prevent deterioration of the light control layer by disposing the adhesive layer containing a weathering agent at the light source side of external light in relation to the light control layer instead of adding a weathering agent, which causes a decrease in formability to the light control layer. Further, since the adhesive layer contains a weathering agent, weatherability of the adhesive layer itself can also be improved. However, even in such a window film, since deterioration occurs due to elapse of the time, the function of the window film cannot be maintained over a long time, and thus a problem arises in which weatherability and durability are deteriorated.

The present inventors conducted thorough investigations on the causes of the above-described problem and found out the reason was a weathering agent contained in the adhesive layer in the aforementioned window film being bled out over time. That is, the inventors found that since the content of the weathering agent in the adhesive layer was decreased due to the bleeding out of the weathering agent, optical deterioration of the adhesive layer itself occurred, and as a result, weatherability and durability of the entire window film were decreased.

In this regard, according to an embodiment of the present invention, the bleeding out of the weathering agent contained in the first adhesive layer is suppressed by interposing the barrier layer between the first adhesive layer and the light control layer, and thus a decrease in the content of the weathering agent in the first adhesive layer caused by the elapse of the time can be prevented. Therefore, optical deterioration of the first adhesive layer can be prevented. Further, since wavelength light causing deterioration of the light control layer, such as an ultraviolet ray, is sufficiently absorbed by the weathering agent contained in the first adhesive layer, deterioration of the light control layer can also be suppressed without addition of the weathering agent to the light control layer. That is, weatherability and durability of the entire window film can be improved.

Hereinafter, each portion of the window film will be described in detail.

1. First Adhesive Layer

The first adhesive layer in an embodiment of the present invention contains a weathering agent.

(1) Weathering Agent

As the weathering agent contained in the first adhesive layer, those which can absorb wavelength light causing deterioration of the light control layer or those which can capture radicals generated when a molecular chain of a resin of the first adhesive layer is broken by light irradiation may be used, and examples thereof include an ultraviolet absorbent and a photooxidation inhibitor. Examples of the photooxidation inhibitor include a light stabilizer and an antioxidant.

In an embodiment of the present invention, the weathering agent preferably includes an ultraviolet absorbent.

The ultraviolet absorbent is not particularly limited as long as it can absorb ultraviolet rays having a desired wavelength. Examples of such an ultraviolet absorbent may include an organic ultraviolet absorbent and a reactive ultraviolet absorbent.

Examples of the organic ultraviolet absorbent include benzophenone-based, benzotriazole-based, salicylate-based, phenyl salicylate-based, cyanoacrylate-based, benzoate-based, benzoxazinone-based, triazine-based, hydroxyphenyltriazine-based, substituted acrylonitrile-based, nickel chelate-based, and hindered amine-based ultraviolet absorbents.

Examples of the reactive ultraviolet absorbent include reactive ultraviolet absorbents in which, for example, an addition-polymerizable double bond such as a vinyl group, an acryloyl group, or a methacryloyl group, or an alcoholic hydroxyl group, an amino group, a carboxyl group, an epoxy group, and an isocyanate group is introduced into the above-described organic ultraviolet absorbent and reacted with and fixed on a resin binder. As the method for reaction and fixation, a resin component of a conventionally known monomer, oligomer, or reactive polymer and the reactive ultraviolet absorbent having the addition-polymerizable double bond are radically polymerized so that a copolymer can be obtained. In addition, when the reactive ultraviolet absorbent has a reactive group such as a hydroxyl group, an amino group, a carboxyl group, an epoxy group, or an isocyanate group, the above-described reactive group and a thermoplastic resin having reactivity are used, and a catalyst is used as necessary, and thus the reactive ultraviolet absorbent can be reacted with and fixed on the thermoplastic resin, for example, heat.

As the light stabilizer, for example, a hindered amine-based or nickel complex-based light stabilizer can be used. Specific examples of these light stabilizers include those which are used for an adhesive layer in a member, such as an optical film, requiring a high light transmissive property. Specific examples of the hindered amine-based light stabilizer include Tinuvin™ 111 FDL, Tinuvin™ 123, Tinuvin™ 144, Tinuvin™ 152, Tinuvin™ 292, and Tinuvin™ 5100 (all of which are manufactured by BASF Corp.) and Viosorb 770, Viosorb 622, and Viosorb 765 (all of which are manufactured by KYODO CHEMICAL CO., LTD.).

Further, as the light stabilizer, a reactive light stabilizer having a reactive functional group such as a (meth)acryloyl group in the molecule may be used. Specific examples thereof include 1,2,2,6,6-pentamethyl-4-piperidinyl methacrylate (product name: Sanol LS-3410 manufactured by NIPPON NYUKAZAI CO., LTD.).

As the antioxidant, for example, a hindered phenol-based antioxidant can be used. Specific examples thereof include IRGANOX 1035 and IRGANOX 3114 (all of which are manufactured by Ciba Specialty Chemicals).

In an embodiment of the present invention, the weathering agent preferably includes an ultraviolet absorbent. The reason for this is that, since deterioration of the first adhesive layer and the light control layer occurs mainly due to ultraviolet rays included in external light, deterioration of the window film can be more effectively prevented when the ultraviolet absorbent is used as the weathering agent.

The content of the ultraviolet absorbent (solid content) in the first adhesive layer is preferably in a range of 0.1 parts by mass to 40 parts by mass with respect to 100 parts by mass of an adhesive to be described below. Above all, the content thereof is preferably in a range of 1 part by mass to 30 parts by mass. When the content of the ultraviolet absorbent with respect to 100 parts by mass of the adhesive is larger than the above range, the first adhesive layer may be colored in the case of using, for example, a benzotriazole-based ultraviolet absorbent as the weathering agent, and thus a problem in appearance of the entire window film may arise. On the other hand, when the content of the ultraviolet absorbent is smaller than the above range, wavelength light causing deterioration of the light control layer, such as an ultraviolet ray, cannot be sufficiently absorbed in the first adhesive layer, and thus deterioration of the light control layer may occur in some cases.

In an embodiment of the present invention, the weathering agent may include only an ultraviolet absorbent, but the weathering agent more preferably includes a photooxidation inhibitor in addition to an ultraviolet absorbent. The reason for this is that, when the ultraviolet absorbent and the photooxidation inhibitor are concurrently used as the weathering agent, radicals generated at the time of ultraviolet ray irradiation are captured by the photooxidation inhibitor, and thus oxidation or bond cleavage of the first adhesive layer can be prevented.

When the weathering agent includes the photooxidation inhibitor in addition to the ultraviolet absorbent, the content of the photooxidation inhibitor (solid content) in the first adhesive layer is preferably in a range of 0.1 parts by mass to 40 parts by mass with respect to 100 parts by mass of the adhesive, and above all, is preferably in a range of 1 part by mass to 30 parts by mass. When the content of the photooxidation inhibitor with respect to 100 parts by mass of the adhesive is larger than the above range, from the viewpoint of solubility of the adhesive forming the first adhesive layer, the curing of the first adhesive layer may not be sufficient in some cases. On the other hand, when the content thereof is smaller than the above range, the effect obtained by addition of the photooxidation inhibitor may not be exerted in some cases.

Incidentally, the fact that the weathering agent includes the photooxidation inhibitor in addition to the ultraviolet absorbent means that the weathering agent includes at least one of a light stabilizer and an antioxidant as the photooxidation inhibitor in addition to the ultraviolet absorbent, and the weathering agent may include both the light stabilizer and the antioxidant. When the weathering agent includes both the light stabilizer and the antioxidant as the photooxidation inhibitor, the total amount of each content of the light stabilizer and the antioxidant is in the above range.

(2) Adhesive

The adhesive used in the first adhesive layer is not particularly limited as long as it is a material that enables the first adhesive layer to exhibit a desired adhesive force and to have a high light transmissive property. Examples of such an adhesive include an acrylic adhesive, a silicon-based adhesive, an ester-based adhesive, a urethane-based adhesive, a fluorine-based adhesive, a polyimide-based adhesive, an epoxy-based adhesive, a polyurethane ester-based adhesive, a vinyl acetate-based adhesive, a synthetic rubber-based adhesive, and a natural rubber-based adhesive. Among them, from the viewpoint of excellent transparency, durability, and heat stability and low cost, an acrylic adhesive is preferable. Examples of the acrylic adhesive may include an acrylic acid ester copolymer obtained by copolymerizing acrylic acid ester and another monomer.

Examples of the acrylic acid ester may include ethyl acrylate, n-butyl acrylate, 2-ethylhexyl acrylate, isooctyl acrylate, isononyl acrylate, hydroxyethyl acrylate, propylene glycol acrylate, acrylamide, and glycidyl acrylate. Among them, from the viewpoint of having a satisfactory pasting property with respect to, for example, a window glass as an adhered body, ethyl acrylate, n-butyl acrylate, or 2-ethylhexyl acrylate is preferable. Further, the acrylic acid ester may be used alone or as a mixture of a plurality thereof.

Examples of another monomer described above may include methyl acrylate, methyl methacrylate, styrene, acrylonitrile, vinyl acetate, acrylic acid, methacrylic acid, itaconic acid, hydroxyethyl acrylate, hydroxyethyl methacrylate, propylene glycol acrylate, acrylamide, methacrylamide, glycidyl acrylate, glycidyl methacrylate, dimethylaminoethyl methacrylate, tert-butylaminoethyl methacrylate, and n-ethylhexyl methacrylate. Among them, n-ethylhexyl methacrylate is preferable. Further, another monomer described above may be used alone or as a mixture of a plurality thereof.

(3) Other Additives

The first adhesive layer may contain other additives in addition to the aforementioned materials. Examples of the additive include a cross-linking agent, a silane coupling agent, a tackifier, a filler, and a leveling agent. Examples of the cross-linking agent include isocyanate-based, metal chelate-based, epoxy-based, and melamine-based cross-linking agents.

(4) First Adhesive Layer

The film thickness of the first adhesive layer may be such a thickness that the aforementioned desired amount of the weathering agent can be contained, and for example, is in a range of 10 µm to 80 µm, and above all, is preferably in a range of 15 µm to 60 µm and particularly preferably in a range of 20 µm to 40 µm. When the film thickness of the first adhesive layer is larger than the above range, poor appearance caused by decreasing the light transmissive property of the window film or increasing haze may occur, and there may be an unsatisfactory case in terms of construction. On the other hand, when the film thickness thereof is smaller than the above range, desired amount of the weathering agent cannot be contained or desired adhesive force may not be obtained and thus the performance of the window film cannot be secured in some cases.

The adhesive force of the first adhesive layer is in a range of 4 N/25 mm to 30 N/25 mm, and above all, is preferably in a range of 4 N/25 mm to 25 N/25 mm and particularly preferably in a range of 4 N/25 mm to 20 N/25 mm. The reason for this is that, when the adhesive force of the first adhesive layer is in the above range, it is possible to stably paste the window film to an adhered body such as a window glass and the window film can be peeled off from the adhered body, for example, without any adhesive residual remaining on the adhered body when the window film is peeled off.

Incidentally, the adhesive force is a value measured by performing the 180° peeling method (300 mm/min) to a sample having a width of 25 mm (adhered body: soda-lime glass, thickness: 3 mm) according to the method based on JIS 20237.

Further, at this time, the adhesive force of the first adhesive layer is preferably equal to or smaller than the adhesive force of a second adhesive layer to be described below. The reason for this is that the second adhesive layer is obtained by pasting a barrier layer to a light control layer for example, and when the adhesive force of the first adhesive layer is larger than the adhesive force of the second adhesive layer, material fractures are generated between the second adhesive layer and the barrier layer at the time of peeing off the window film pasted to the adhered body such as a window glass, and thus adhesive residuals of a part of the window film may remain on the surface of the adhered body in some cases.

Incidentally, the details of the adhesive force of the second adhesive layer will be described later.

The forming method of the first adhesive layer is not particularly limited as long as the first adhesive layer can be formed to have a desired film thickness, but for example, a method, in which a coating solution for forming a first adhesive layer obtained by dissolving the aforementioned material in a desired solvent is applied to one surface of the barrier layer and the coating film is cured by heating, can be used. Particularly, aging treatment is preferably performed after heat curing in order to accelerate the cross linking in the adhesive layer.

Examples of the method of applying the coating solution for forming a first adhesive layer include a coating method using a knife coater, an applicator coater, a die coater, a comma coater, a gravure coater, or a roll coater.

2. Barrier Layer

The barrier layer in an embodiment of the present invention is provided between the first adhesive layer containing a weathering agent and the second adhesive layer.

The barrier layer can prevent the bleeding out of the weathering agent from the first adhesive layer.

The barrier layer may have a high light transmissive property and a layer structure in which the weathering agent is less likely to be bled out, and for example, a layer formed by a resin material is preferable. Incidentally, in the barrier layer formed by a resin material, the layer structure in which the bleeding out is less likely to occur means that the crosslinking density of the resin in the layer is high.

Examples of the barrier layer include a sheet or film formed of polyethylene terephthalate (PET), polyethylene naphthalate (PEN), polyether sulfone (PES), polyimide (PI), polyether ether ketone (PEEK), polycarbonate (PC), polyethylene (PE), polypropylene (PP), polyphenylene sulfide (PPS), polyetherimide (PEI), cellulose triacetate (CTA), cyclic polyolefin (COP), polymethyl methacrylate (PMMA), polysulfone (PSF), polyamide imide (PAI), an acrylic resin, an acryl polyol resin, an acryl-urethane copolymer, an acryl polyol-isocyanate copolymer, a urethane resin, a melamine resin, a polyvinyl chloride resin, a fluorine resin, or isocyanate.

Among them, the barrier layer is preferably formed by PET. The reason for this is that, since the barrier layer formed by PET has a high crosslinking density, the bleeding out of the weathering agent can be prevented efficiently, and PET is inexpensive and has broad utility.

Further, in addition to a resin layer formed by the aforementioned resin material, the barrier layer may include a transparent inorganic compound layer formed of a transparent inorganic material on the resin layer. The reason for this is that, since the transparent inorganic compound layer has a high layer density, the bleeding out can be prevented with high efficiency even in the case of a thin film.

The material of the transparent inorganic compound layer may be a material having a high light transmissive property, and examples thereof include inorganic oxide such as Si, Al, or Ti, inorganic nitride, inorganic carbide, inorganic oxycarbide, inorganic carbonitride, inorganic oxynitride, and inorganic oxycarbonitride.

The barrier layer is preferably a thin film to such a degree that the bleeding out of the weathering agent from the first adhesive layer can be sufficiently suppressed. The film thickness of a barrier layer is, for example, in a range of 10 µm to 70 µm, and above all, is preferably in a range of 12 µm to 50 µm and particularly preferably in a range of 16 µm to 25 µm. When the film thickness of the barrier layer is larger than the above range, poor appearance caused by decreasing the light transmissive property of the window film or increasing haze may occur, and there may be an unsatisfactory case in terms of construction. On the other hand, when the film thickness thereof is smaller than the above range, the weathering agent may ooze out through the barrier layer, or the window film has weak resilience and wrinkles are easily generated in production of the window film and thus the appearance may be deteriorated in some cases.

3. Second Adhesive Layer

The second adhesive layer in an embodiment of the present invention is provided between a barrier layer and a light control layer.

As an adhesive used in the second adhesive layer, the same adhesive described in the section of "1. First Adhesive Layer" described above can be used, but above all, an acrylic adhesive is preferable.

In addition, the adhesive used in the second adhesive layer may be the same as or different from the adhesive used in the first adhesive layer.

The second adhesive layer generally does not contain the weathering agent described in the section of "1. First Adhesive Layer" from the viewpoint of preventing the bleeding out of the weathering agent to the light control layer, but may contain the weathering agent. Further, the second adhesive layer may appropriately contain an additive as necessary in addition to the weathering agent. The weathering agent and the additive contained in the second adhesive layer are the same weathering agent and additive described in the section of "1. First Adhesive Layer."

The film thickness of the second adhesive layer is preferably a thickness that enables the barrier layer and the light control layer to be pasted to each other with a sufficient adhesive force and the window film to have a desired light transmissive property. For example, the film thickness thereof is in a range of 10 µm to 50 µm, and above all, is preferably in a range of 10 µm to 40 µm and particularly preferably in a range of 10 µm to 30 µm.

When the film thickness of the second adhesive layer is larger than the above range, the light transmissive property of the window film may be decreased in some cases. On the other hand, when the film thickness thereof is smaller than the above range, the barrier layer and the light control layer cannot be sufficiently pasted to each other, and a mechanical strength of the window film may be decreased in some cases.

Incidentally, the film thickness of the second adhesive layer may be equal to or smaller than the film thickness of the first adhesive layer.

The adhesive force of the second adhesive layer may be a strength that enables the light control layer and the barrier layer to be sufficiently pasted to each other and to be hardly peeled off, and for example, is preferably 20 N/25 mm or more. When the adhesive force of the second adhesive layer is in the above range, the light control layer and the barrier layer are sufficiently pasted to each other in the window film, and thus material fractures caused by peeling off can be less likely to occur between the layers.

Incidentally, the measurement method of the adhesive force is the same as the method described in "1. First Adhesive Layer."

The forming method of the second adhesive layer is not particularly limited as long as the second adhesive layer can be formed to have a desired film thickness, but the same method as the aforementioned forming method of the first adhesive layer is preferably used.

4. Light Control Layer

The light control layer in an embodiment of the present invention is laminated with the second adhesive layer.

Incidentally, in an embodiment of the present invention, the light control layer generally does not contain the weathering agent from the aforementioned reason, but may contain the weathering agent to such a degree that the formation of the light control layer is not inhibited.

The light control layer in an embodiment of the present invention may be a layer having a structure that enables heat rays and visible rays to be selectively transmissive, and examples thereof include a louver type and a prism type. Among them, a louver-type light control layer is preferable. The reason for this is that the louver-type light control layer can secure the quantity of lighting by reflection of incident light, or selectively transmit and block heat rays depending on an incident angle of external light.

Hereinafter, the louver-type light control layer and other light control layer will be separately described.

(1) Louver-Type Light Control Layer

The louver-type light control layer in an embodiment of the present invention includes a light transmission portion having a plurality of grooves on one surface thereof and light control portions formed in the grooves.

Figure 2A:
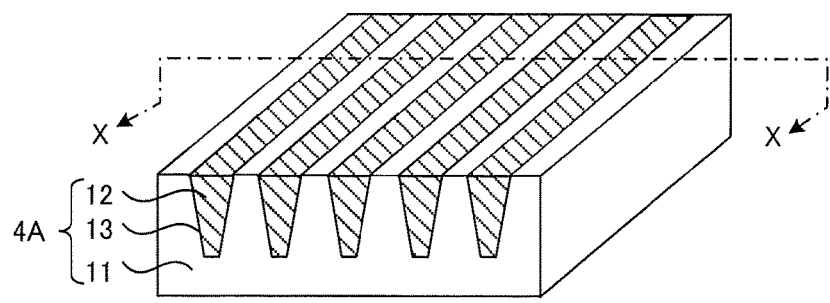
FIGS. 2A and 2B are a schematic perspective view and a cross-sectional view respectively illustrating an example of a louver-type light control layer.
Figure 2B:
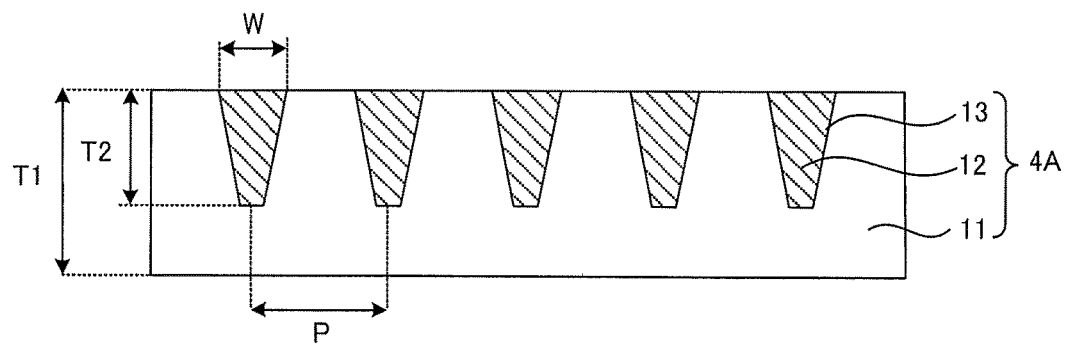

The louver-type light control layer will be described with reference to the drawing. FIG. 2A is a schematic perspective view illustrating an example of the louver-type light control layer in an embodiment of the present invention, and FIG. 2B is a vertical cross-sectional view taken along X-X line of FIG. 2A. As illustrated in FIGS. 2A and 2B, a louver-type light control layer 4A includes a light transmission portion 11 having a plurality of grooves 13 formed linearly and in parallel therein, and light control portions 12 provided in the grooves 13.

In the louver-type light control layer, a method for controlling light can be selected depending on the material of the light control portion. For example, when the light control portion serves as a low refractive index portion formed of a resin material having a refractive index lower than the light transmission portion, the total reflection of light caused by a difference in refractive index is generated at an interface between the light transmission portion and the light control portion, and thus the quantity of lighting can be increased by using the reflected light. Further, when the light control portion serves as a heat ray absorbing portion formed by a material including heat ray absorbing particles, the transmission and block of heat rays can be selectively performed. Furthermore, when the light control portion serves as a light diffusion portion formed by a material exhibiting a covering property, light is diffused and reflected at the interface between the light control portion and the light transmission portion, and thus the quantity of lighting to the inside of the room can be increased.

Figure 3A:
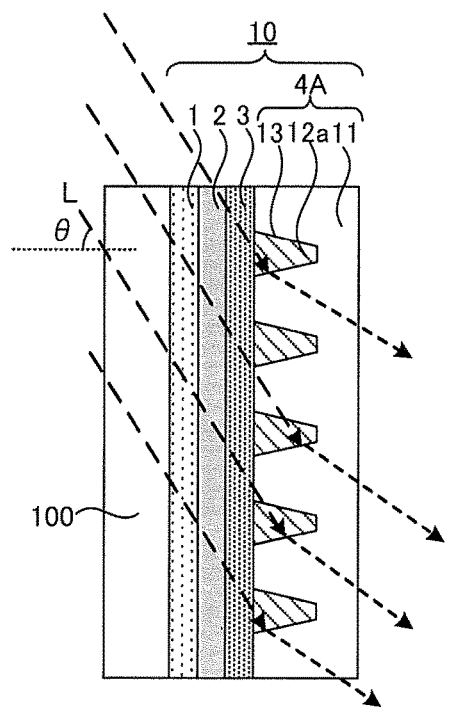
FIGS. 3A and 3B are explanatory diagrams for explaining a light transmissive route in the window film which includes a louver-type light control layer including a light control portion serving as a heat ray absorbing portion.
Figure 3B:
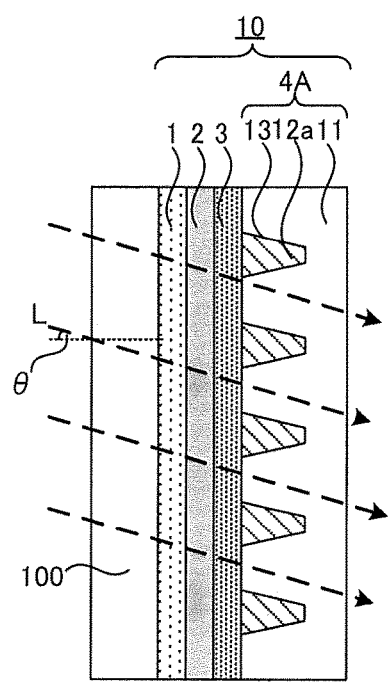

FIGS. 3A and 3B are explanatory diagrams for explaining a light transmissive route in the window film which includes a louver-type light control layer including a light control portion serving as a heat ray absorbing portion. The symbols in FIGS. 3A and 3B are the same as those described in FIG. 1 and FIGS. 2A and 2B. For example, as illustrated in FIG. 3A, since an incident angle θ of solar light L with respect to a window glass 100 increases in summer months in which the solar altitude is high, the solar light L is dominantly incident from the lateral surface of a heat ray absorbing portion 12a. At this time, visible light transmits through the heat ray absorbing portion 12a and enters the inside of the room. On the other hand, since heat rays are absorbed in the heat ray absorbing portion 12a, entering of the heat rays to the inside of the room is blocked. That is, in summer months, it is possible to secure the illuminance in the room by using visible light and to suppress an increase in temperature in the room caused by heat rays.

On the other hand, as illustrated in FIG. 3B, in winter months in which the solar altitude is low, the incident angle θ of the solar light L with respect to the window glass 100 is decreased, and the solar light L is incident from an angle nearly perpendicular to the surface of the window glass 100. For this reason, compared to the case in summer months as illustrated in FIG. 3A, the proportion of the solar light L incident to the light transmission portion 11 becomes larger than to the proportion of the solar light L incident to the heat ray absorbing portion 12a. Since heat rays also transmit through the light transmission portion 11, both the visible light and the heat rays can enter inside the room. That is, in winter months, it is possible to achieve both the securing of the illuminance in the room by using visible light and the increasing of temperature in the room by heat rays.

Hereinafter, each configuration of the louver-type light control layer will be described.

(a) Light Transmission Portion

As the material of the light transmission portion, an ionizing radiation curable resin is preferable. Examples of the ionizing radiation curable resin include an ultraviolet curable resin, an electron beam curable resin, a visible ray curable resin, and a near infrared ray curable resin, but above all, an ultraviolet curable resin and an electron beam curable resin are preferable.

As the ultraviolet curable resin and the electron beam curable resin, it is possible to appropriately select and use any of polymerizable oligomers or prepolymers which are conventionally used. Examples thereof may include polymerizable oligomers or prepolymers; particularly, polyfunctional polymerizable oligomers or prepolymers are exemplified. As the polymerizable oligomers or prepolymers, oligomers or prepolymers having a radical-polymerizable unsaturated group in the molecule such as epoxy (meth)acrylate-based, urethane (meth) acrylate-based, polyether-based urethane (meth) acrylate, caprolactone-based urethane (meth) acrylate, polyester (meth) acrylate-based, polyether (meth)acrylate-based oligomers or prepolymers, and modified bisphenol A di(meth)acrylate such as ethylene oxide (EO)-modified, propylene oxide (PO)-modified, or propoxylated-ethoxylated bisphenol A di(meth)acrylate may be exemplified. These may be used alone or in combination of two or more kinds thereof. Incidentally, "(meth)acrylate" means "acrylate or methacrylate".

When polyfunctional urethane (meth)acrylate is used as the material used in the light transmission portion, monofunctional (meth)acrylate such as methyl (meth)acrylate can be concurrently used as a diluent for the purpose of, for example, adjusting the viscosity. The monofunctional (meth) acrylate may be used alone or in combination of two or more kinds thereof, and low-molecular-weight polyfunctional (meth)acrylate may be concurrently used.

Further, when the ultraviolet curable resin is used as the material of the light transmission portion, a photopolymerization initiator is preferably used concurrently. As the type of the photopolymerization initiator, those which are conventionally used can be used. The content ratio of the photopolymerization initiator in the light transmission portion is preferably in a range of about 0.1 parts by mass to 5 parts by mass with respect to 100 parts by mass of the ultraviolet curable resin.

The light transmission portion may contain an arbitrary additive in addition to the aforementioned resin. Examples of the arbitrary additive include a mold releasing agent, a polymerization inhibitor, a cross-linking agent, an antioxidant, a plasticizer, a defoamer, and a filler. Incidentally, in an embodiment of the present invention, the light transmission portion generally does not contain an ultraviolet absorbent and a photooxidation inhibitor as the weathering agent, but may contain the ultraviolet absorbent and the photooxidation inhibitor to such a degree that the formation of the light transmission portion is not inhibited.

The thickness of the light transmission portion is appropriately selected depending on the height of the groove, but for example, is preferably in a range of 10 μm to 300 μm, and above all, is preferably in a range of 25 μm to 250 μm and particularly preferably in a range of 50 μm to 200 μm. When the thickness of the light transmission portion is larger than the above range, the quantity of emitted light to the inside of the room is decreased because incident light is absorbed in the light transmission portion, and thus the visibility of the window film may be decreased in some cases. On the other hand, when the thickness thereof is smaller than the above range, it may be difficult to make the groove have a desired shape in some cases.

Incidentally, the thickness of the light transmission portion corresponds to the thickness of the louver-type light control layer, and is a portion represented by T1 in FIG. 2B.

For example, regarding the vertical cross-sectional shape of the groove of the light transmission portion is the same as the vertical cross-sectional shape of a light control portion to be described later, and thus the description thereof is omitted in this section.

The refractive index of the light transmission portion is appropriately selected depending on the type of the light control portion, but for example, is in a range of 1.40 to 1.80, and above all, is preferably in a range of 1.45 to 1.70 and particularly preferably in a range of 1.50 to 1.65.

Incidentally, the refractive index of the light transmission portion is a value measured by using a sodium light source with a measurement wavelength of 589 nm under the condition of temperature of 23° C. by means of an Abbe refractometer (manufactured by ATAGO CO., LTD.) according to the measurement method of the refractive index defined by JIS K 7142. In the following description, the measurement method of the refractive index is performed by the above-described method.

Further, the visible light transmittance of the light transmission portion is preferably 70% or more, and above all, is preferably 80% or more and particularly preferably 90% or more. When the light transmission portion has the above-described visible light transmittance, a decrease in the quantity of emitted light to the inside of the room caused by absorbent of incident light in the light transmission portion is suppressed, and thus the visibility of the window film can be improved.

Incidentally, the visible light transmittance is a value obtained by measuring the light transmission portion having a film thickness of 10 μm, which is formed on a PET film (model number: COSMOSHINE™ A4300, film thickness: 100 μm, manufactured by TOYOBO CO., LTD.), in a measurement wavelength range of 380 nm to 780 nm by using a spectrophotometer (manufactured by SHIMADZU CORPORATION UV-2450, product in conformity to JIS K 0115).

(b) Light Control Portion

The light control portion is formed in the groove of the light transmission portion. That is, the light control portion and the groove have generally the same shape. Further, the function of the light control portion can be selected depending on the constituent material.

Hereinafter, an example of an assumed light control portion will be described.

(i) Low Refractive Index Portion

The low refractive index portion is formed of a resin material having a refractive index lower than the light transmission portion. When the light control portion serves as the low refractive index portion, the total reflection of light caused by a difference in refractive index can be generated at the interface between the light transmission portion and the light control portion, and thus the quantity of lighting can be increased by using the reflected light.

As the material of the low refractive index portion, a transparent resin having a refractive index lower than the light transmission portion may be used, and the ultraviolet curable resin and the electron beam curable resin described in the section of "(a) Light Transmission Portion" described above can be used.

Further, when an ultraviolet curable resin is used, a photopolymerization initiator is preferably used concurrently. As the type of the photopolymerization initiator, those which are conventionally used can be used. The content ratio of the photopolymerization initiator is preferably in a range of about 0.1 parts by mass to 5 parts by mass with respect to 100 parts by mass of the ultraviolet curable resin.

Further, the low refractive index portion may contain other arbitrary materials, but from the viewpoint of shape stability, it is preferable not to contain an ultraviolet absorbent and a photooxidation inhibitor.

The refractive index of the low refractive index portion may be lower than the refractive index of the light transmission portion, and for example, is preferably in a range of 1.40 to 1.55.

The low refractive index portion preferably has a desired visible light transmittance. Specifically, the visible light transmittance thereof is the same as that of the light transmission portion described above, and thus the description herein is omitted.

(ii) Heat Ray Absorbing Portion

The heat ray absorbing portion is formed of a material containing heat ray absorbing particles as a heat ray absorbing agent. When the light control portion serves as the heat ray absorbing portion, it is possible to selectively perform the transmission and block of heat rays.

(Heat Ray Absorbing Particle)

The heat ray absorbing particles may be particles transmitting visible light and absorbing heat rays, that is, having an absorbing characteristic in an infrared light area and a transmitting characteristic in a visible light area, and the visible light transmittance thereof is 50% or more, and above all, 60% or more, particularly 70% or more is preferable. Further, the infrared ray absorbing ratio thereof is preferably 50% or more, and above all, is preferably 60% or more and particularly preferably 70% or more.

Incidentally, the visible light transmittance is an average value of the visible light transmittance in each wavelength when a composition for forming a heat ray absorbing portion, which is used in examples to be described later and contains 95% by mass of a binder resin and 5% by mass of heat ray absorbing particles so that the total amount becomes 100% by mass, is applied onto a PET film manufactured by TOYOBO CO., LTD. (product name: COSMOSHINE™ A4300, film thickness: 100 μm) with a film thickness of 1 μm and measurement is performed in a measurement wavelength of 380 nm to 780 nm by using a spectrophotometer (manufactured by SHIMADZU CORPORATION UV-2450, product in conformity to JIS K 0115).

Further, the infrared ray absorbing ratio is an average value of the infrared ray absorbing ratio in each wavelength when the infrared ray absorbing ratio is measured in a measurement wavelength range of 780 nm to 2500 nm by using the same sample and the same measurement method as in the measurement of the visible light transmittance described above.

Further, as the heat ray absorbing particles, inorganic nano particles can be used, and specifically, nano particles of antimony tin oxide (ATO), indium tin oxide (ITO), lanthanum hexaboride (LaB$_6$), aluminum-doped zinc oxide, indium-doped zinc oxide, gallium-doped zinc oxide, tungsten oxide, cerium hexaboride, anhydrous zinc antimonate, and copper sulfide or a mixture thereof can be used. Among them, antimony tin oxide (ATO), indium tin oxide (ITO), lanthanum hexaboride (LaB$_6$), or a mixture thereof is preferably used.

The heat ray absorbing particle may or may not be transparent, but is preferably transparent.

The heat ray absorbing particles are preferably nano fine particles, and an average particle diameter ($D_{50}$) thereof is, for example, in a range of 10 nm to 200 nm, and above all, is preferably in a range of 20 nm to 150 nm and particularly preferably in a range of 30 nm to 100 nm. When the average particle diameter of the heat ray absorbing particles is larger than the above range, haze is generated, and thus the transparency of the window film may be decreased in some cases. On the other hand, when the average particle diameter is smaller than the above range, heat rays may not be sufficiently absorbed in some cases.

Incidentally, the average particle diameter is a value obtained by observing particles of the heat ray absorbing particles with an electronic microscope and using an arithmetic average.

(Binder Resin)

The heat ray absorbing portion preferably includes at least a binder resin in addition to the aforementioned heat ray absorbing particle. The binder resin is not particularly limited as long as it is a material that can be cured by irradiation of ionizing radiation. Incidentally, the ionizing radiation may be classified by the quantum energy of electromagnetic waves in some cases, but in an embodiment of the present invention, the ionizing radiation means all ultraviolet rays (UV-A, UV-B, and UV-C), visible rays, y rays, X rays, electron beams, and active energy rays. Among them, from the viewpoint of high versatility, ultraviolet rays are preferable.

The material of the binder resin is preferably an ionizing radiation curable resin polymerized, in which the main component is a monomer, oligomer, prepolymer, or polymer, having a radically polymerizable active group in its structure. Examples of the ionizing radiation curable resin include an ultraviolet curable resin, an electron beam curable resin, a visible ray curable resin, and a near infrared ray curable resin. Among them, an ultraviolet curable resin and an electron beam curable resin are preferably used. Specific examples thereof include an epoxy acrylate-based, urethane acrylate-based, polyether acrylate-based, polyester acrylate-based, or polythiol-based reactive oligomer, and a reactive monomer of a polyfunctional compound such as vinyl pyrrolidone, 2-ethylhexyl acrylate, β-hydroxyacrylate, tetrahydrofurfuryl acrylate, or polyfunctional(meth)acrylate.

Further, the binder resin preferably includes a photopolymerization initiator. The reason for this is that the binder resin can be cured by irradiation of, for example, an ultraviolet ray having a wavelength of 300 nm to 400 nm. The photopolymerization initiator can be appropriately selected depending on the type of ionizing radiation to be radiated, and for example, a ketone-based or acetophenone-based photopolymerization initiator, specifically, Sandray 1000, Darocure™1163, Darocure™1173, Irgacure™183, or Irgacure™651 can be used. Incidentally, the content ratio of the photopolymerization initiator can be appropriately adjusted according to the amount of the binder resin, and for example, the content thereof is preferably in a range of about 0.1 parts by mass to 5 parts by mass with respect to 100 parts by mass of the binder resin.

The binder resin in the heat ray absorbing portion preferably has a small refractive index of visible light. The reason for this is that, since the above-mentioned heat ray absorbing particles have a large refractive index of visible light, the refractive index of the entire heat ray absorbing portion can be adjusted by decreasing the refractive index of the binder resin.

The content ratio of the binder resin in the heat ray absorbing portion is in a range of 40% by mass to 98% by mass with respect to the total mass (100% by mass) of the heat ray absorbing portion, and above all, is preferably in a range of 50% by mass to 95% by mass. When the content ratio of the binder resin is larger than the above range, the concentration of the heat ray absorbing particles is decreased, and thus heat rays may not be sufficiently absorbed in some cases. On the other hand, when the content ratio thereof is smaller than the above range, adhesion with the light transmission portion may be deteriorated in some cases.

(Heat Ray Absorbing Portion)

The heat ray absorbing portion may contain, for example, a photoinitiator in addition to the heat ray absorbing particles and the binder resin described above, but from the viewpoint of shape stability, it is preferable not to contain an ultraviolet absorbent and a photooxidation inhibitor.

The heat ray absorbing portion preferably has a desired visible light transmittance and a desired infrared ray absorbing ratio. Specifically, since the above-mentioned heat ray absorbing portion has the same visible light transmittance and the same infrared ray absorbing ratio of the heat ray absorbing particles, the description herein is omitted.

Further, the heat ray absorbing portion preferably has a desired refractive index with respect to visible light, and particularly, a difference in refractive index in the light transmission portion with respect to visible light is preferably small. When a difference in refractive index between the light control portion and the light transmission portion is large, a plurality of streaks parallel to the vertical direction of an image to be projected to the window film are generated, a rainbow-like unclear image (hereinafter, referred to as "ghosting"), in which colors of the image are decomposed to the direction the streaks are generated, is generated, and thus high visibility may not be obtained in some cases. The reason for this is that the diffusion in emitted light of visible light transmitting through the light control portion and the light transmission portion and visible light transmitting only through the light transmission portion is biased.

Specifically, the refractive index of the heat ray absorbing portion is in a range of 1.40 to 1.80, and above all, is preferably in a range of 1.45 to 1.70 and particularly preferably in a range of 1.50 to 1.65. Further, a difference in refractive index between the light transmission portion and the heat ray absorbing portion is 0.025 or less, and particularly, is preferably 0.015 or less.

(iii) Light Diffusion Portion

The light diffusion portion is formed of a material exhibiting a covering property. When the light control portion serves as the light diffusion portion, light is diffused and reflected at the interface between the light control portion and the light transmission portion, and thus the quantity of lighting to the inside of the room can be increased.

As the material of the light diffusion portion, a material having a covering property is preferable, and examples thereof include a white pigment and a silver pigment. Examples of the white pigment include metal oxide such as titanium oxide, titanium dioxide, magnesium oxide, or zinc oxide. Examples of the silver pigment include metal such as aluminum or chromium.

Further, the light diffusion portion may contain other arbitrary materials as necessary, but it is preferable not to contain an ultraviolet absorbent and a photooxidation inhibitor.

Further, from the viewpoint of making the light diffusion and reflection at the interface between the light diffusion portion and the light transmission portion easy, the interface between the light diffusion portion and the light transmission portion may be formed as a matte surface.

(iv) Light Control Portion

Figures 4A, 4B, 4C:
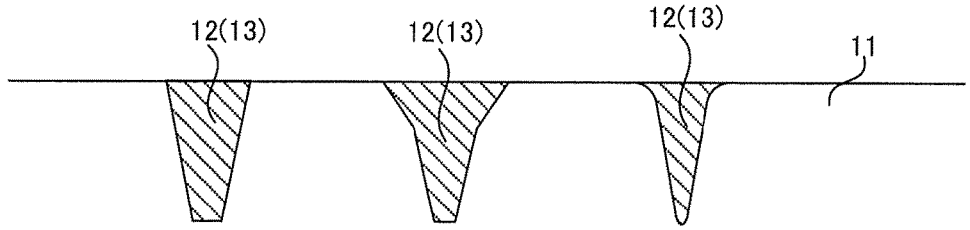
FIGS. 4A to 4C are schematic sectional views illustrating an example of a vertical cross-sectional shape of the light control portion.

Examples of the vertical cross-sectional shape of the light control portion include a triangular shape, a square shape, a rectangular shape, a trapezoidal shape, a tapered shape in which oblique sides of at least one of lateral surfaces are formed by two or more straight or curved lines, and a shape in which four sides are curved lines. Further, the corner portion of the light control portion may have a curvature according to the shape of the groove, and the sides of the lateral surfaces forming the vertical cross-sectional shape may be a straight line or a curved line. Incidentally, FIGS. 4A to 4C are schematic sectional views illustrating an example of the vertical cross-sectional shape of the light control portion, FIG. 4A illustrates an example of the light control portion having a trapezoidal shape, FIG. 4B illustrates an example of the light control portion having a tapered shape in which oblique sides of both the lateral surfaces are formed by two straight lines, and FIG. 4C illustrates an example of the light control portion having a triangular shape in which the corner has a curvature.

The shape of the light control portion in planar view is not particularly limited, and for example, may be a straight line shape or a curved line shape. Further, the arrangement of the light control portions in planar view may be a parallel arrangement, or the light control portions may be arranged in parallel or may be randomly arranged in another direction. Particularly, as illustrated in FIG. 2A, it is preferable that the light control portions be arranged parallel in a straight line shape in planar view.

The height of the light control portion is preferably in a range of 10 μm to 300 μm, and above all, is preferably in a range of 25 μm to 250 μm and particularly preferably in a range of 50 μm to 200 μm. Further, the height of the light control portion is in a range of 30% to less than 100% of the thickness of the light transmission portion, and above all, is preferably in a range of 40% to 97.5% and particularly preferably in a range of 50% to 95%. When the height of the light transmission portion is not in the above range, the thickness of the window film is relatively increased, and thus a bending property may be deteriorated in some cases. Incidentally, the height of the light control portion indicates a portion represented by T2 in FIG. 2B.

The width of the light control portion can be appropriately set depending on the type of the light control portion. For example, when the light control portion serves as the low refractive index portion or the heat ray absorbing portion, the width thereof is in a range of 5 μm to 50 μm, and above all, is preferably in a range of 7 μm to 45 μm and particularly preferably in a range of 10 μm to 40 μm. When the width of the light control portion is larger than the above range, visible light may hardly transmit through the entire window film in some cases. On the other hand, when the width thereof is smaller than the above range, the light control portion may not have a desired height and desired light reflecting function or heat ray absorbing function may not be exerted in some cases.

Further, when the light control portion serves as a light diffusion portion, the width thereof is preferably in a range of 5 μm to 150 μm. When the width of the light diffusion portion is larger than the above range, a light scattering effect may be difficult to be obtained in some cases. Incidentally, the width of the light control portion indicates a portion having the widest width in the vertical cross-sectional shape of the light control portion, and for example, indicates a portion represented by W in FIG. 2B.

The length of the light control portion is appropriately selected depending on the size of a desired window film. Incidentally, the length of the light control portion indicates the length in the lengthy direction in planar view.

The pitch width of the light control portion can be appropriately selected depending on the type of the light control portion.

For example, when the light control portion serves as the low refractive index portion or the heat ray absorbing portion, the pitch width thereof is in a range of 15 μm to 200 μm, and above all, is preferably in a range of 20 μm to 150 μm and particularly preferably in a range of 25 μm to 100 μm. When the pitch width thereof is larger than the above range, external light with a large incident angle is less likely to be incident to the light control portion, and thus the function of the light control portion may not be sufficiently exerted in some cases. On the other hand, when the pitch width thereof is smaller than the above range, visible light may be less likely to transmit in the light transmission portion in some cases.

Further, when the light control portion serves as the light diffusion portion, the pitch width thereof is preferably in a range of 10 μm to 200 μm. When the pitch width thereof is smaller than the above range, the quantity of lighting by light diffusion may not be increased in some cases.

Incidentally, the pitch width of the light control portion indicates a distance between centers of adjacent light control portions, and for example, indicates a portion represented by P in FIG. 2B.

(c) Louver-Type Light Control Layer

The surface of the louver-type light control layer including light control portions may be flat or have concavities and convexities, and can be appropriately selected depending on the function of the light control layer. For example, when the window film requires high visibility, the surface is preferably flat and the average surface roughness (Ra) is in a range of 0.1 nm to 100 nm, and above all, is in a range of 0.1 nm to 20 nm and particularly preferably in a range of 0.1 nm to 10 nm.

When the surface has concavities and convexities, in a region in which the incident surface or the emitting surface of external light is flat and a region in which the incident surface or the emitting surface of external light is concave or convex, the diffusion of light in the incident surface or the emitting surface of each region is biased. For this reason, the quantity of the emitted light is biased, and thus diffraction phenomenon and interference phenomenon of light are induced. According to this, ghosting may be expressed on the window film and thus visibility may be deteriorated in some cases.

Incidentally, the average surface roughness (Ra) is defined as a value calculated by the following Formula (1) when measurement is performed under the measurement environment of 23° C. according to the provision of JIS B0601 2001, only a reference length is extracted in the direction of an average line from a roughness curve, the X axis is taken on the average line direction of the extracted portion and the Y axis is taken on the direction of an longitudinal magnification, and the roughness curve is expressed by y=f(x).

[Mathematical Formula 1]

$$Ra=\int f(x)dx \quad (1)$$

Further, the surface of the louver-type light control layer including light control portions may have a planarization layer or a scattering layer. The reason for this is that diffraction phenomenon or interference phenomenon of light can be suppressed and a decrease in visibility of the window film caused by expression of ghosting can be prevented. In addition, a photocatalytic layer may be included for the purpose of control of an air chamber.

As the arrangement aspect of the louver-type light control layer in the window film, the surface of the light control layer including light control portions may be set as a paste surface with the second adhesive layer or a surface facing the above-described surface (a surface of the light control layer not including light control portions) may be set as a paste surface with the second adhesive layer. Incidentally, the arrangement aspect of the louver-type light control layer in the window film illustrated in FIGS. 3A and 3B represents the aspect in which the surface of the light control layer including light control portions is set as a paste surface with the second adhesive layer.

The forming method of the louver-type light control layer is not particularly limited as long as a light transmission portion having a plurality of grooves with a desired shape can be formed on the surface thereof and light control portions can be formed in the grooves.

The forming method of the light transmission portion is not particularly limited, and for example, the light transmission portion can be formed in such a manner that a composition for forming a light transmission portion containing a material of the light transmission portion is applied onto a substrate and then cross-linked and cured in a state which a forming plate having convex portions is pressed against the substrate. The forming plate used at this time has a plurality of convex portions on the surface thereof, and the reversed shape of the convex portion and the dimension thereof generally correspond to the shape and the dimension of the groove.

The coating method of the composition for forming a light transmission portion is not particularly limited as long as the composition can be applied with an uniform film thickness, and for example, a spin coating method, a die coating method, a dip coating method, a bar coating method, a gravure printing method, or a screen printing method can be used.

As the curing method of the composition for forming a light transmission portion, curing is preferably performed by irradiation of ionizing radiation, and particularly, from the viewpoint of being practical, curing is preferably performed by using ultraviolet rays or electron beams. For example, the curing condition can be appropriately set depending on the material of the light transmission portion.

Further, the forming method of the light control portion is not particularly limited, and for example, a method, in which a composition for forming a light control portion containing a material of the light control portion is applied and the composition is filled in the grooves of the light transmission portion and cured, can be used.

As the coating method of the composition for forming a light control portion is not particularly limited as long as it is a method by which the composition can be sufficiently filled in at least the grooves, and for example, a wiping method, a coating method, a dry laminating method, or an extrusion laminating method can be used. Further, when the composition for forming a light control portion is applied, an excessive amount of the composition for forming a light control portion flowing out to the surface of the light transmission portion from the groove may be removed by leveling off using a squeegee for example.

As the curing method of the composition for forming a light control portion, curing is preferably performed by irradiation of ionizing radiation such as ultraviolet rays or electron beams, and for example, the curing condition can be appropriately set depending on the material and the type of the ionizing radiation.

(2) Other Light Control Layers

Figure 5:
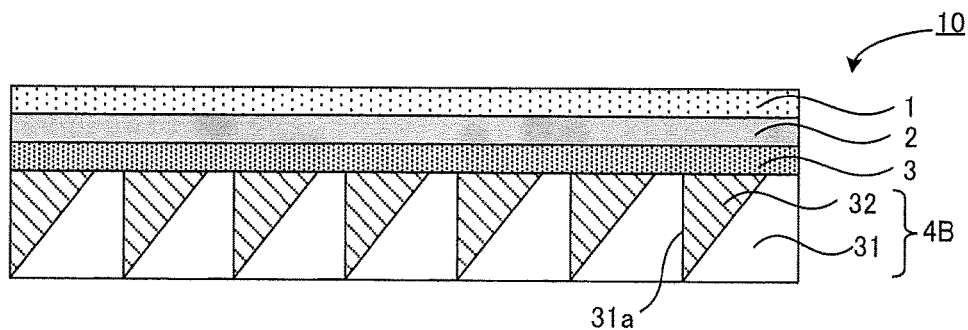
FIG. 5 is a schematic sectional view illustrating another example of the window film.

As other light control layers, for example, a prism-type light control layer can be used. The prism-type light control layer has a function of polarizing and reflecting external light to control the incident direction of light to the inside of the room. For example, as illustrated in FIG. 5, a prism-type light control layer 4B has a structure including a plurality of unit prisms 31 having a trapezoidal cross-section, and when external light is totally reflected in a polarization surface 31a of the unit prism 31, desired polarized light is generated, and thus the incident direction can be controlled when the external light is incident to the inside of the room.

Incidentally, a space between adjacent unit prisms (a portion represented by 32 in FIG. 5) may be filled with air or may be filled with a material having a different bending ratio from the unit prism.

Regarding the material of the unit prism, the same material of the light transmission portion described in the section of "(1) Louver-Type Light Control Layer" can be used.

Further, regarding the details of the structure of the unit prism, for example, the same details of the unit prism described in Japanese Patent Application Laid-Open (JP-A) No. 2013-155569 can be employed.

The film thickness of the prism-type light control layer is preferably 10 μm or more and 200 μm or less. When the film thickness is smaller than the above range, optical performance may not be sufficient or processing of the prism-type light control layer becomes finer so that accuracy may decrease in some cases. When the film thickness is larger than the above range, the prism-type light control layer may be difficult to peel off from the mold when the prism-type light control layer is molded in some cases.

5. Substrate

The window film may include a substrate. The substrate is generally included in a surface opposite to a surface on which the second adhesive layer is provided among surfaces of the light control layer.

The substrate is not particularly limited as long as it has a light transmissive property and does not give an adverse effect to visibility, and for example, a sheet or film formed of a resin having transparency can be used. Particularly, a film is preferably used.

As a resin to be used in the substrate, a resin having transparency and a strength that enables the light control layer to be supported may be used for example. For example, it is possible to use polyethylene terephthalate, polyester, polyurethane, polyvinyl alcohol, polycarbonate, vinyl chloride, fluorine resin, or rubber. Among them, from the viewpoint of transparency and strength, polyethylene terephthalate or polycarbonate is preferable. In addition, the substrate may contain an antioxidant or an ultraviolet absorbent, for example.

One surface or both surfaces of the substrate may be subjected to surface treatment, for example, as necessary. Examples of the surface treatment include surface treatment performed by an oxidation method such as corona discharge treatment, chromium acid treatment (wet type), flame treatment, hot-air treatment, or ozone and ultraviolet irradiation treatment, surface treatment performed by a roughening method such as a sandblast method or a solvent treatment method, and chemical surface treatment.

The film thickness of the substrate can be appropriately set depending on the use purpose, but is generally in a range of 5 μm to 200 μm, and particularly, is preferably in a range of 10 μm to 150 μm. When the film thickness of the substrate is smaller than the above range, curls or wrinkles may be easily generated, and sufficient strength of the window film may not be obtained in some cases.

6. Delaminating Layer

The window film preferably includes a delaminating layer on the first adhesive layer. When the delaminating layer is included, it is possible to prevent dust from being attached to the first adhesive layer until the window film is pasted to an adhered body such as a window glass and to prevent a decrease in visibility of the window film due to contamination. Further, the reason for providing the delaminating layer is that when the surface of the first adhesive layer becomes rough at the time of winding the window film which has been wound in a roll shape, the defect of the winding can be prevented.

The material of the delaminating layer is not particularly limited as long as it is generally used, and examples thereof include an acrylic or methacrylic resin such as polymethyl acrylate and polymethyl methacrylate, a polyvinyl chloride resin, a cellulose resin, a silicon resin, chlorinated rubber, casein, various surfactants, and metal oxide. These materials may be used alone or as a mixture of two or more kinds thereof.

V. Overcoat Layer

The window film may include an overcoat layer between the second adhesive layer and the light control layer, from the viewpoint of improving adhesion between the second adhesive layer and the light control layer and improving appearance.

As the material of the overcoat layer, an ionizing radiation curable resin is preferably used, and any of polymerizable oligomers and prepolymers can be appropriately selected and used. Among them, polyfunctional polymerizable oligomers or prepolymers are preferably used. Examples of the polymerizable oligomers or prepolymers include oligomers or prepolymers having a radical-polymerizable unsaturated monomer in the molecule, such as epoxy (meth)acrylate-based, urethane (meth) acrylate-based, polyether-based urethane (meth) acrylate, caprolactone-based urethane (meth) acrylate, polyester (meth)acrylate-based, and polyether (meth) acrylate-based oligomers or prepolymers. Particularly, from the viewpoint of achieving a balance between weatherability and hard coating properties, polyfunctional urethane (meth)acrylate-based oligomers or prepolymers are preferable, and in terms of molecular weight, oligomers or prepolymers having a molecular weight of about 1000 to 5000 are preferable.

Incidentally, (meth) acrylate described herein indicates acrylate or methacrylate.

A high-molecular urethane (meth) acrylate, such as caprolactone-based urethane (meth) acrylate, which is obtained by reaction of caprolactone-based polyol, organic isocyanate, and hydroxyacrylate, or polybutadiene (meth) acrylate having a (meth) acrylate group in the side chain of a polybutadiene oligomer and high hydrophobicity, can be concurrently used in the ionizing radiation curable resin, in addition to the polyfunctional polymerizable oligomers. The reason for this is that the weatherability of the overcoat layer can be improved. Among them, a caprolactone-based material is preferably used concurrently.

Further, when polyfunctional urethane (meth) acrylate is used as the material of the overcoat layer, a diluent such as monofunctional (meth) acrylate such as methyl (meth) acrylate can be concurrently used for the purpose of adjusting the viscosity of the polyfunctional urethane (meth) acrylate. The monofunctional (meth) acrylate may be used alone or in combination of two or more kinds thereof, and a low-molecular-weight polyfunctional (meth) acrylate may be concurrently used. Further, as the diluent, the above-described monomer is used so that coating properties can be secured.

The overcoat layer may contain an ultraviolet absorbent, a light stabilizer, or a silicate compound. The details of the ultraviolet absorbent and the light stabilizer are the same as those described in the section of "1. First Adhesive Layer."

The thickness of the overcoat layer is in a range of 0 μm to 40 μm, and above all, is in a range of 0 μm to 20 μm and particularly preferably in a range of 0 μm to 10 μm.

As the forming method of the overcoat layer, for example, a coating solution in which the aforementioned material is diluted in a desired solvent is prepared, the coating solution is applied onto a light control layer or a substrate, and thus the overcoat layer can be formed.

As the coating method, for example, applicator coating, via bar coating, wire bar coating, a gravure coater, or a die coater can be used.

8. Other Arbitrary Layers

The window film may include a scratch resistance layer or a self-cleaning layer provided on another surface which faces the paste surface with the second adhesive layer of the surfaces of the light control layer. In a case the another surface of the light control layer and the substrate are pasted to each other, the scratch resistance layer or the self-cleaning layer is disposed on the another surface of the light control layer with the substrate interposed therebetween. Among them, it is preferable to include the scratch resistance layer.

The details of the scratch resistance layer and the self-cleaning layer can be the same as those of the overcoat layer described above.

9. Window Film

Regarding the visible light transmittance of the window film, the visible light transmittance when the incident angle of external light is 0° is preferably 65% or more, particularly 70% or more and more preferably 85% or more. The visible light transmittance when the incident angle of external light is 0° is set to be in the above range so that appearance, for example, can be clearly observed. Further, the quantity of visible light entering the inside of a room, for example, increases and thus illuminance of the inside of the room can be secured by using external light. The incident angle of external light described herein indicates an angle θ represented in FIGS. 3A and 3B.

Incidentally, the visible light transmittance is calculated by measuring the spectral transmittance in a wavelength band of 380 nm to 780 nm according to JIS A5759-2008 using an infrared-visible-ultraviolet spectrophotometer (UV- 3100PC manufactured by SHIMADZU CORPORATION) and is calculated by the calculation formula defined by JIS A5759-2008.

As the use aspect of the window film, the first adhesive layer and the barrier layer are preferably disposed at the light source side of external light in relation to the light control layer. The reason for this is that the effect of the present invention is further exerted. For this reason, the window film is mainly used for indoor application.

10. Production Method

The production method of the window film is not particularly limited as long as it is a method by which a desired layer configuration can be formed. Examples of the method include a method in which a coating solution for forming a second adhesive layer which contains a material for the second adhesive layer is applied onto a light control layer and the coating solution is dried to form a second adhesive layer, a barrier layer is laminated on the second adhesive layer, and then the coating solution for forming a first adhesive layer is applied thereon and dried to form a first adhesive layer. As the forming method of each layer, the method described in the section explaining each of the aforementioned layers can be used.

11. Use Application

The window film can be used by being pasted to, for example, window glasses or opening portions of buildings, houses, vehicles such as electric trains, cars, and buses, airplanes, or ships.

Incidentally, the present invention is not limited to the foregoing embodiment. The embodiment is merely an example, and any that has substantially the same feature and demonstrate the same functions and effects as those in the technical concept described in claims of the present invention is included in the technical scope of the present invention.

EXAMPLES

Hereinafter, the present invention will be described in more detail by means of examples and comparative examples.

1. Window Film Having Heat Ray Absorbing Portion

A window film having a heat ray absorbing portion as a light control portion was obtained by the following method.

Example 1

(Formation of Light Control Layer)

A light control layer was formed by the following method.

(1) Formation of Light Transmission Portion and Grooves

A liquid composition A for forming a light transmission portion having the following composition was applied to one surface of a biaxially stretched transparent PET film (thickness: 100 μm) in the form of a continuous belt so that the film thickness after curing became 200 μm.

<Composition a for Forming Light Transmission Portion>
  EO-modified bisphenol A diacrylate (product name: FA-324A, manufactured by Hitachi Chemical Co., Ltd.) . . . 100 parts by mass
  Benzophenone-based photoinitiator (photopolymerization initiator, product name: IRGACURE™ 184, manufactured by Ciba Specialty Chemicals) . . . 1 part by mass A roll mold, in which a convex shape group (having the same shape as that of the absorbing portion group and reversed concavity and convexity) was formed; the convex shape group being a plurality of convex portions arranged in parallel to each other at an interval of 90 μm, was prepared. The convex portions were continued linearly in a circumferential direction along the planar direction of the surface and the main cross-section thereof was a rectangular shape having a height of 150 μm, a width at the plate surface side of 20 μm, and a width of the side far away from the plate of 20 μm.

The composition A for forming a light transmission portion was cross-linked and cured by ultraviolet ray irradiation using a mercury lamp in a state which the composition A for forming a light transmission portion was interposed between the roll mold and the PET film, and then the roll mold was removed so as to form a light transmission portion, which has grooves on the surface thereof, on one surface of the PET film.

The shape of the groove was a reversed shape of the convex shape group of the roll mold, that is, the concave shape group in which the vertical cross-sectional shape is rectangular.

(2) Formation of Light Control Portion

Next, a heat ray absorbing portion serving as a light control portion was formed in the groove. First, a liquid composition for forming a heat ray absorbing portion having the following composition was prepared, and the composition was applied to the surface of the light transmission portion including a groove, and then was squeegeed with an iron doctor blade so as to be filled only in the groove. Thereafter, the composition for forming a heat ray absorbing portion was cross-linked and cured by ultraviolet ray irradiation using a mercury lamp to form a heat ray absorbing portion so as to obtain a louver-type light control layer.

<Composition for Forming Heat Ray Absorbing Portion>

| | |
|---|---|
| Transparent acrylic ultraviolet curable prepolymer (binder resin) formed of a mixed liquid of urethane acrylate (manufactured by Daicel-Cytec Company, Ltd.) and a dipentaerythritol acrylate oligomer (manufactured by Shin-Nakamura Chemical Co., Ltd.) | 100 parts by mass |
| ATO nanoparticles (average particle diameter: 100 nm) | 4.5 parts by mass |
| LaB | 0.6 parts by mass |
| 1-Hydroxycyclohexyl phenyl ketone (photopolymerization initiator, product name: IRGACURE ™ 184, manufactured by BASF Corp.) | 1 part by mass |

(Formation of Overcoat Layer)

The above-described composition A for forming a light transmission portion was applied so as to fill in concave portions of about 2 μm generated on the surface including the heat ray absorbing portions of the louver-type light control layer and was cured by ultraviolet ray irradiation so as to form a flat and smooth overcoat layer (Ra=0.12 nm).

(Formation of Second Adhesive Layer)

To 100 parts by mass of acrylic copolymer B (product name: SK-Dyne™ 1429 DT, solid content: 30%, manufactured by Soken Chemical & Engineering Co., Ltd.), 10 parts by mass (3 parts by mass in terms of the solid content) of alumichelate cross-linking agent (product name: AD-5A, manufactured by Soken Chemical & Engineering Co., Ltd.) was added, and stirred with a scriber at 50 rpm for 10 minutes so as to obtain a coating solution A for forming a second adhesive layer. Thereafter, the coating solution A for forming a second adhesive layer was applied to the surface of the light control layer including an overcoat layer by means of an applicator so that the film thickness before drying became 83 μm, and then was dried at 80° C. for 2 minutes to form a second adhesive layer having the film thickness after drying of 25 µm.

The adhesive force of the second adhesive layer was 25 N/25 mm. Incidentally, the adhesive force was measured by the measurement method described in the section of "1. First Adhesive Layer" described above. The same is applied to the following examples and comparative examples.

(Formation of Barrier Layer)

A PET film (product name: COSMOSHINE™ A4300, film thickness: 16 µm, manufactured by TOYOBO CO., LTD.) was laminated as a barrier layer on the second adhesive layer.

(Formation of First Adhesive Layer)

To 100 parts by mass of acrylic copolymer A (product name: OC3447, solid content: 30%, manufactured by SAIDEN CHEMICAL INDUSTRY CO., LTD.), 4 parts by mass (1.18 parts by mass in terms of the solid content) of benzotriazole-based ultraviolet absorbent A (product name: Viosorb 520, manufactured by KYODO CHEMICAL CO., LTD.) was dissolved by stirring with a scriber at 50 rpm for 30 minutes. Further, 0.15 parts by mass (0.15 parts by mass in terms of the solid content) of isocyanate XDI-based (adduct type) curing agent (product name: K-341, solid content: 75%, manufactured by SAIDEN CHEMICAL INDUSTRY CO., LTD.) was added thereto and the resultant mixture was stirred for 10 minutes to obtain a coating solution A for forming a first adhesive layer.

Next, the coating solution A for forming a first adhesive layer was applied to the surface of the barrier layer by means of an applicator so that the film thickness before drying became 83 µm, and then was dried at 80° C. for 2 minutes to form a first adhesive layer having the film thickness after drying of 25 µm. The adhesive force of the first adhesive layer was 10 N/25 mm. Incidentally, the adhesive force was measured by the measurement method described in the section of "1. First Adhesive Layer" described above.

Thereafter, a light-peel separator film having a reduced silicon-transfer property (product name: P381031, film thickness: 38 µm, manufactured by LINTEC Corporation) was laminated on the first adhesive layer and was aged at 40° C. for 5 days to obtain a window film.

Example 2

A window film was obtained in the same manner as in Example 1, except that a first adhesive layer was formed by using a coating solution B for forming a first adhesive layer in which an ultraviolet absorbent was changed to a benzotriazole-based ultraviolet absorbent B (product name: Tinuvin™ 384-2, manufactured by BASF Corp.). The adhesive force of the first adhesive layer was 10 N/25 mm.

Example 3

A window film was obtained in the same manner as in Example 1, except that a first adhesive layer was formed by using a coating solution C for forming a first adhesive layer in which an ultraviolet absorbent was changed to a benzotriazole-based ultraviolet absorbent C (product name: Tinuvin™ 928, manufactured by BASF Corp.). The adhesive force of the first adhesive layer was 10 N/25 mm.

Example 4

A window film was obtained in the same manner as in Example 1, except that a PET film having a film thickness of 23 µm was used as a barrier layer.

Example 5

A window film was obtained in the same manner as in Example 1, except that a second adhesive layer was formed by using a coating solution B for forming a second adhesive layer having the following composition. Incidentally, the preparation method of the coating solution B for forming a second adhesive layer was performed by the same method as that of the coating solution A for forming a second adhesive layer. The adhesive force of the second adhesive layer was 25 N/25 mm.

<Coating Solution B for Forming Second Adhesive Layer>

| | |
|---|---|
| Acrylic copolymer C (product name: SK-Dyne™ 2094DT, solid content: 25%, manufactured by Soken Chemical & Engineering Co., Ltd.) | 100 parts by mass |
| Epoxy curing agent (product name: E-5XM, solid content: 5%, manufactured by Soken Chemical & Engineering Co., Ltd.) | 0.27 parts by mass (0.054 parts by mass in terms of the solid content) |

Example 6

A window film was obtained in the same manner as in Example 1, except that a first adhesive layer was formed by using a coating solution D for forming a first adhesive layer having the following composition. Incidentally, the preparation method of the coating solution D for forming a first adhesive layer was performed by the same method as that of the coating solution A for forming a first adhesive layer. The adhesive force of the first adhesive layer was 15 N/25 mm.

<Coating Solution D for Forming First Adhesive Layer>

| | |
|---|---|
| Acrylic copolymer D (product name: OC3949, solid content: 20.5%, manufactured by SAIDEN CHEMICAL INDUSTRY CO., LTD.) | 100 parts by mass |
| Isocyanate XDI-based (adduct type) curing agent (product name: K-130, solid content: 75%, manufactured by SAIDEN CHEMICAL INDUSTRY CO., LTD.) | 0.15 parts by mass (3 parts by mass in terms of solid content) |
| Benzotriazole-based ultraviolet absorbent A | 4 parts by mass |

Example 7

A window film was obtained in the same manner as in Example 1, except that a first adhesive layer was formed by using a coating solution E for forming a first adhesive layer having the following composition. Incidentally, the preparation method of the coating solution E for forming a first adhesive layer was performed by the same method as that of the coating solution A for forming a first adhesive layer. The adhesive force of the first adhesive layer was 16 N/25 mm.

<Coating Solution E for Forming First Adhesive Layer>

| | |
|---|---|
| Acrylic copolymer E (product name: SK-Dyne™ 1435DT, solid content: 30%, manufactured by Soken Chemical & Engineering Co., Ltd.) | 100 parts by mass |
| Isocyanate-based (XDI-based) curing agent (product name: TD-75, solid content: 75%, manufactured by Soken Chemical & Engineering Co., Ltd.) | 1.3 parts by mass (10 parts by mass in terms of solid content) |
| Benzotriazole-based ultraviolet absorbent A | 4 parts by mass |

Example 8

A window film was obtained in the same manner as in Example 1, except that a second adhesive layer was formed by using a coating solution C for forming a second adhesive layer having the following composition. Incidentally, the preparation method of the coating solution C for forming a second adhesive layer was performed by the same method as that of the coating solution A for forming a second adhesive layer. The adhesive force of the second adhesive layer was 25 N/25 mm.

<Coating Solution C for Forming Second Adhesive Layer>

| | |
|---|---|
| Acrylic copolymer B | 100 parts by mass |
| Isocyanate-based (TDI-based) curing agent (product name: M-5ADT, solid content: 5%, manufactured by Soken Chemical & Engineering Co., Ltd.) | 3 parts by mass (10 parts by mass in terms of solid content) |

Comparative Example 1

A window film was obtained in the same manner as in Example 1, except that a second adhesive layer was formed by using the coating solution A for forming a first adhesive layer having the above composition and a barrier layer and a first adhesive layer were not provided. The adhesive force of the second adhesive layer was 10 N/25 mm.

Comparative Example 2

A window film was obtained in the same manner as in Example 1, except that a second adhesive layer was formed by using a coating solution D for forming a second adhesive layer having the following composition and a barrier layer and a first adhesive layer were not provided. Incidentally, the preparation method of the coating solution D for forming a second adhesive layer was performed by the same method as that of the coating solution A for forming a second adhesive layer. The adhesive force of the second adhesive layer was 25 N/25 mm.

<Coating Solution D for Forming Second Adhesive Layer>

| | |
|---|---|
| Acrylic copolymer C (product name: SK-Dyne™ 2094, solid content: 30%, manufactured by Soken Chemical & Engineering Co., Ltd.) | 100 parts by mass |
| Benzotriazole-based ultraviolet absorbent A | 4 parts by mass (1.18 parts by mass in terms of solid content) |

[Evaluation 1]
(Test for Ultraviolet Deterioration Resistance)

Each window film of Examples 1 to 8 and Comparative Examples 1 and 2 was pasted on a glass (100 mm long×100 mm wide×2.8 mm thick, manufactured by Tokyo Tokushu Glass Co., Ltd.) to prepare a test piece. A test for ultraviolet deterioration resistance was performed on each test piece according to the following procedures so as to evaluate the appearance and the holding power after the deterioration.

The following procedures (A), (B), and (C) were set as one cycle, and the test for ultraviolet deterioration resistance was repeated for 42 cycles by using an ultra accelerated ultraviolet deterioration resistance tester (manufactured by IWASAKI ELECTRIC CO., LTD., product name: EYE Super UV Tester, model number: SUV-W23).

(A) The test piece was irradiated with an ultraviolet ray (illuminance of 60 mW/cm$^2$, peak wavelength of 365 nm) for 20 hours under atmosphere of a temperature at 63° C. and a humidity of 50% RH.

(B) Water was sprayed on the test piece by a shower for 30 seconds.

(C) The test piece was held for 4 hours under atmosphere of a temperature at 63° C. and a humidity of 98% RH without irradiation of the ultraviolet ray.

<Appearance Evaluation>

A color difference was measured for each test piece after the test for ultraviolet deterioration resistance. The measurement was performed by using a spectrophotometer (manufactured by SHIMADZU CORPORATION, model number: UV-3100PC), and a ΔE*ab value was measured by a transmission method according to JIS K 7105. Incidentally, the ΔE*ab value is a value obtained from the color difference formula $(\Delta E^*ab=\{(\Delta L^*)^2+(\Delta a^*)^2+(\Delta b^*)^2\}^{1/2})$ based on (L*, a*, b*) space colorimetric system of the CIE1976 standard. The case of having a ΔE*ab value of less than 3 was rated as ○ and the case of having a ΔE*ab value of 3 or more was rated as X. The case of having a ΔE*ab value of less than 3 exhibited satisfactory weatherability without yellow discoloration being observed. In the case of having a ΔE*ab value of 3 or more, yellow discoloration to the degree which may cause a practical problem was recognized.

<Holding Power Evaluation>

A holding power was measured for each test piece after the test for ultraviolet deterioration resistance by using Tensilon (product name: RTG-1205, manufactured by A&D Company, Limited) according to JIS A 5759 by means of a head with a maximum load capacity of 0.5 kN. The case of having a holding power of 4 N or more was rated as ○ and the case of having a holding power of less than 4 N was rated as X. The test piece having a holding power of less than 4 N was light-peeled due to the test for ultraviolet deterioration resistance.

The results of the appearance evaluation and the holding power evaluation on the window films of Examples 1 to 8 and Comparative Examples 1 and 2 are shown in Table 1.

TABLE 1

| | | Example 1 | Example 2 | Example 3 | Example 4 | Example 5 |
|---|---|---|---|---|---|---|
| Light control layer | Light transmission portion | Composition A for forming light transmission portion | Composition A for forming light transmission portion | Composition A for forming light transmission portion | Composition A for forming light transmission portion | Composition A for forming light transmission portion |
| | Light control portion | Composition for forming heat ray absorbing portion | Composition for forming heat ray absorbing portion | Composition for forming heat ray absorbing portion | Composition for forming heat ray absorbing portion | Composition for forming heat ray absorbing portion |

TABLE 1-continued

|  |  | | | | | |
|---|---|---|---|---|---|---|
| First adhesive layer | Main agent | Acrylic copolymer A | Acrylic copolymer A | Acrylic copolymer A | Acrylic copolymer A | Acrylic copolymer A |
|  | Curing agent | Isocyanate XDI-based | Isocyanate XDI-based | Isocyanate XDI-based | Isocyanate XDI-based | Isocyanate XDI-based |
|  | Ultraviolet absorbent | Benzotriazole-based A | Benzotriazole-based B | Benzotriazole-based C | Benzotriazole-based A | Benzotriazole-based A |
|  | Light stabilizer | None | None | None | None | None |
|  | Oxidation inhibitor | None | None | None | None | None |
|  | Adhesive force (N/25 mm) | 10 | 10 | 10 | 10 | 10 |
| Barrier layer |  | PET (16 μm) | PET (16 μm) | PET (16 μm) | PET (23 μm) | PET (16 μm) |
| Second adhesive layer | Main agent | Acrylic copolymer B | Acrylic copolymer B | Acrylic copolymer B | Acrylic copolymer B | Acrylic copolymer C |
|  | Curing agent (cross-linking agent) | Alumichelate | Alumichelate | Alumichelate | Alumichelate | Epoxy |
|  | Ultraviolet absorbent | None | None | None | None | None |
|  | Adhesive force (N/25 mm) | 25 | 25 | 25 | 25 | 25 |
| Evaluation (after 1000 h) | Appearance | ○ | ○ | ○ | ○ | ○ |
|  | Holding power | ○ | ○ | ○ | ○ | ○ |

|  |  | Example 6 | Example 7 | Example 8 | Comparative Example 1 | Comparative Example 2 |
|---|---|---|---|---|---|---|
| Light control layer | Light transmission portion | Composition A for forming light transmission portion | Composition A for forming light transmission portion | Composition A for forming light transmission portion | Composition A for forming light transmission portion | Composition A for forming light transmission portion |
|  | Light control portion | Composition for forming heat ray absorbing portion | Composition for forming heat ray absorbing portion | Composition for forming heat ray absorbing portion | Composition for forming heat ray absorbing portion | Composition for forming heat ray absorbing portion |
| First adhesive layer | Main agent | Acrylic copolymer D | Acrylic copolymer E | Acrylic copolymer A | None | None |
|  | Curing agent | Isocyanate XDI-based | Isocyanate XDI-based | Isocyanate XDI-based | None | None |
|  | Ultraviolet absorbent | Benzotriazole-based A | Benzotriazole-based A | Benzotriazole-based A | None | None |
|  | Light stabilizer | None | None | None | None | None |
|  | Oxidation inhibitor | None | None | None | None | None |
|  | Adhesive force (N/25 mm) | 15 | 16 | 10 | None | None |
| Barrier layer |  | PET (16 μm) | PET (16 μm) | PET (16 μm) | None | None |
| Second adhesive layer | Main agent | Acrylic copolymer B | Acrylic copolymer B | Acrylic copolymer B | Acrylic copolymer A | Acrylic copolymer C |
|  | Curing agent (cross-linking agent) | Alumichelate | Alumichelate | Isocyanate TDI-based | Isocyanate XDI-based | None |
|  | Ultraviolet absorbent | None | None | None | Benzotriazole-based A | Benzotriazole-based A |
|  | Adhesive force (N/25 mm) | 25 | 25 | 25 | 10 | 25 |
| Evaluation (after 1000 h) | Appearance | ○ | ○ | ○ | ○ | X |
|  | Holding power | ○ | ○ | ○ | X | X |

From the results in Table 1, in Examples 1 to 8 including the barrier layer, regardless of the composition of the first adhesive layer, the appearance and the holding power thereof were satisfactory even after the test for ultraviolet deterioration resistance. On the other hand, in Comparative Examples 1 and 2 not including the barrier layer, yellow discoloration and a decrease in holding power were recognized after the test for ultraviolet deterioration resistance. The reason for this is estimated that deterioration of the second adhesive layer occurred due to the bleeding out of the weathering agent contained in the second adhesive layer in the comparative examples.

From the results, it was found that when the barrier layer was interposed between the first adhesive layer and the light control layer, a window film with excellent weatherability and durability was obtained.

Example 9

(Formation of Light Control Layer)

A light control layer was formed in the same manner as in Example 1, except that a roll mold, in which a convex shape group (having the same shape as that of the absorbing portion group and reversed concavity and convexity) was formed; the convex shape group being a plurality of convex portions arranged in parallel to each other at an interval of 78 μm; the convex portions being continued linearly in a circumferential direction along the planar direction of the surface and had the main cross-section with a rectangular shape having a height of 150 μm, a width at the plate surface side of 28 μm, and a width of the side (surface width of the apex) far away from the plate of 24 μm, was used.

(Formation of Second Adhesive Layer)

The following composition materials were stirred for 10 minutes to prepare a coating solution E for forming a second adhesive layer. Thereafter, the coating solution E for forming a second adhesive layer was applied to the surface of the light control layer including a heat ray absorbing portion by means of an applicator so that a wet film thickness became 83 μm, and then was dried at 80° C. for 2 minutes to prepare a second adhesive layer having a film thickness after drying of 25 μm. The adhesive force of the second adhesive layer was 25 N/25 mm.

(Composition of Coating Solution E for Forming Second Adhesive Layer)

| Acrylic copolymer B | 100 parts by mass |
| Isocyanate HDI-based curing agent (product name: Y-75, manufactured by Soken Chemical & Engineering Co., Ltd.) | 0.5 parts by mass (solid content ratio) |

(Formation of Barrier Layer)

A PET film (product name: Lumirror™ T60, film thickness: 16 μm, manufactured by TORAY INDUSTRIES, INC.) was laminated as a barrier layer on the second adhesive layer.

(Formation of First Adhesive Layer)

A first adhesive layer was formed and a window film was obtained in the same manner as in Example 1, except that a coating solution F for forming a first adhesive layer having the following composition was used. Incidentally, the coating solution F for forming a first adhesive layer was prepared by stirring the following composition materials for 10 minutes. The adhesive force of the first adhesive layer on the barrier layer was 15 N/25 mm.

(Composition of Coating Solution F for Forming First Adhesive Layer)

| Acrylic copolymer B | 100 parts by mass |
| Isocyanate HDI-based curing agent (product name: Y-75, manufactured by Soken Chemical & Engineering Co., Ltd.) | 0.5 parts by mass (solid content ratio) |
| Benzotriazole-based ultraviolet absorbent C | 4 parts by mass (1.18 parts by mass in terms of solid content) |
| Hindered amine-based light stabilizer A (product name: Tinuvin™ 152 N-OR type, manufactured by BASF Corp.) | 2.5 parts by mass |

Example 10

A window film was obtained in the same manner as in Example 9, except that a coating solution G for forming a first adhesive layer having the following composition was used. The adhesive force of the first adhesive layer was 15 N/25 mm.

(Composition of Coating Solution G for Forming First Adhesive Layer)

| Acrylic copolymer B | 100 parts by mass |
| Isocyanate HDI-based curing agent (product name: Y-75, manufactured by Soken Chemical & Engineering Co., Ltd.) | 0.5 parts by mass |
| Benzotriazole-based ultraviolet absorbent B | 4 parts by mass |
| Hindered amine-based light stabilizer A | 2.5 parts by mass |

Example 11

A window film was obtained in the same manner as in Example 9, except that a coating solution H for forming a first adhesive layer having the following composition was used. The adhesive force of the first adhesive layer was 15 N/25 mm.

(Composition of Coating Solution H for Forming First Adhesive Layer)

| Acrylic copolymer B | 100 parts by mass |
| Isocyanate XDI-based curing agent (product name: TD-75, manufactured by Soken Chemical & Engineering Co., Ltd.) | 0.5 parts by mass |
| Benzotriazole-based ultraviolet absorbent C | 4 parts by mass |
| Hindered amine-based light stabilizer A | 2.5 parts by mass |

Example 12

A window film was obtained in the same manner as in Example 9, except that a coating solution I for forming a first adhesive layer having the following composition was used. The adhesive force of the first adhesive layer was 15 N/25 mm.

(Composition of Coating Solution I for Forming First Adhesive Layer)

| Acrylic copolymer B | 100 parts by mass |
| Isocyanate TDI-based curing agent (product name: L-45E, manufactured by Soken Chemical & Engineering Co., Ltd.) | 0.5 parts by mass |
| Benzotriazole-based ultraviolet absorbent C | 4 parts by mass |
| Hindered amine-based light stabilizer A | 2.5 parts by mass |

Example 13

A window film was obtained in the same manner as in Example 9, except that a coating solution J for forming a first adhesive layer having the following composition was used. The adhesive force of the first adhesive layer was 15 N/25 mm.

(Composition of Coating Solution J for Forming First Adhesive Layer)

| Acrylic copolymer B | 100 parts by mass |
| Isocyanate HDI-based curing agent (product name: Y-75, manufactured by Soken Chemical & Engineering Co., Ltd.) | 0.5 parts by mass |
| Benzotriazole-based ultraviolet absorbent C | 4 parts by mass |
| Hindered amine-based light stabilizer B (product name: Tinuvin™ 292 N—CH$_3$ type, manufactured by BASF Corp.) | 2.5 parts by mass |

Example 14

A window film was obtained in the same manner as in Example 9, except that a coating solution K for forming a first adhesive layer having the following composition was used. The adhesive force of the first adhesive layer was 15 N/25 mm.

(Composition of Coating Solution K for Forming First Adhesive Layer)

| | |
|---|---|
| Acrylic copolymer B | 100 parts by mass |
| Isocyanate HDI-based curing agent (product name: Y-75, manufactured by Soken Chemical & Engineering Co., Ltd.) | 0.5 parts by mass |
| Benzotriazole-based ultraviolet absorbent C | 4 parts by mass |
| Hindered amine-based light stabilizer C (product name: Tinuvin™ 123 N-OR type, manufactured by BASF Corp.) | 2.5 parts by mass |

Example 15

A window film was obtained in the same manner as in Example 9, except that a coating solution L for forming a first adhesive layer having the following composition was used. The adhesive force of the first adhesive layer was 15 N/25 mm.

(Composition of Coating Solution L for Forming First Adhesive Layer)

| | |
|---|---|
| Acrylic copolymer B | 100 parts by mass |
| Isocyanate HDI-based curing agent (product name: Y-75, manufactured by Soken Chemical & Engineering Co., Ltd.) | 0.5 parts by mass |
| Benzotriazole-based ultraviolet absorbent C | 4 parts by mass |
| Hindered amine-based light stabilizer D (product name: Tinuvin™ 144 N—CH₃ type, manufactured by BASF Corp.) | 2.5 parts by mass |

Example 16

A window film was obtained in the same manner as in Example 9, except that a PET film (product name: Lumirror™ T60, film thickness: 25 μm, manufactured by TORAY INDUSTRIES, INC.) was used as a barrier layer.

Example 17

A window film was obtained in the same manner as in Example 9, except that a PET film (product name: Lumirror™ T60, film thickness: 50 μm, manufactured by TORAY INDUSTRIES, INC.) was used as a barrier layer.

Example 18

A window film was obtained in the same manner as in Example 9, except that a PET film (product name: COSMOSHINE™ A4300, film thickness: 50 μm, manufactured by TOYOBO CO., LTD.) was used as a barrier layer.

Example 19

A window film was obtained in the same manner as in Example 9, except that a coating solution M for forming a first adhesive layer having the following composition was used. The adhesive force of the first adhesive layer was 10 N/25 mm.

(Composition of Coating Solution M for Forming First Adhesive Layer)

| | |
|---|---|
| Acrylic copolymer B | 100 parts by mass |
| Isocyanate HDI-based curing agent (product name: Y-75, manufactured by Soken Chemical & Engineering Co., Ltd.) | 0.5 parts by mass |
| Benzotriazole-based ultraviolet absorbent C | 4 parts by mass |
| Hindered amine-based light stabilizer D | 2.5 parts by mass |
| Antioxidant A (product name: IRGANOX™ 1035, manufactured by Ciba Specialty Chemicals) | 3 parts by mass |

Example 20

A window film was obtained in the same manner as in Example 9, except that a coating solution N for forming a first adhesive layer having the following composition was used. The adhesive force of the first adhesive layer was 15 N/25 mm.

(Composition of Coating Solution N for Forming First Adhesive Layer)

| | |
|---|---|
| Acrylic copolymer B | 100 parts by mass |
| Isocyanate HDI-based curing agent (product name: Y-75, manufactured by Soken Chemical & Engineering Co., Ltd.) | 0.5 parts by mass |
| Benzotriazole-based ultraviolet absorbent C | 4 parts by mass |

Comparative Example 3

A window film was obtained in the same manner as in Example 9, except that a second adhesive layer was formed on a light control layer by using the coating solution N for forming a first adhesive layer and a barrier layer and a first adhesive layer were not provided. The adhesive force of the second adhesive layer was 15 N/25 mm.

Comparative Example 4

A window film was obtained in the same manner as in Example 9, except that a second adhesive layer was formed on a light control layer by using a coating solution F for forming a second adhesive layer having the following composition and a barrier layer and a first adhesive layer were not provided. The adhesive force of the second adhesive layer was 25 N/25 mm.

(Composition of Coating Solution F for Forming Second Adhesive Layer)

| | |
|---|---|
| Acrylic copolymer B | 100 parts by mass |
| Isocyanate HDI-based curing agent (product name: Y-75, manufactured by Soken Chemical & Engineering Co., Ltd.) | 0.5 parts by mass |

2. Window Film Including Low Refractive Index Portion

A window film including a low refractive index portion as a light control portion was obtained by the following method.

Example 21

(Formation of Light Control Layer)

A liquid composition B for forming a light transmission portion having the following composition was applied to one surface of a biaxially stretched transparent PET film (thickness: 100 µm) in the form of a continuous belt so that the film thickness after curing became 200 µm.

<Composition B for Forming Light Transmission Portion>

| | |
|---|---|
| EO-modified bisphenol A diacrylate (product name: FA-324A, manufactured by Hitachi Chemical Co., Ltd.) | 80 parts by mass |
| Phenoxypolyethylene glycol acrylate (product name: AMP-20GY, manufactured by Shin-Nakamura Chemical Co., Ltd.) | 6 parts by mass |
| Cardo polymer of epoxy acrylate (product name: OGSOL EA-0300, manufactured by Osaka Gas Chemicals Co., Ltd.) | 10 parts by mass |
| Benzophenone-based photopolymerization initiator (product name: IRGACURE™ 184, manufactured by Ciba Specialty Chemicals) | 4 parts by mass |

The composition B for forming a light transmission portion was cross-linked and cured by using the roll mold used in Example 9 by ultraviolet ray irradiation using a mercury lamp in a state which the coated layer of the composition B for forming a light transmission portion was interposed between the roll mold and the PET film, and then the roll mold was removed so as to form a light transmission portion, which has grooves formed on the surface thereof, on one surface of the PET film. The shape of the groove was a shape corresponding to the reversed shape of the convex shape group of the roll mold.

(2) Formation of Light Control Portion

Next, a low refractive index portion serving as a light control portion was formed in the groove. First, a liquid composition for forming a low refractive index portion having the following composition was prepared, and the composition was applied to the surface of the light transmission portion including a groove, and then was squeegeed with an iron doctor blade so as to be filled only in the groove. Thereafter, the composition for forming a low refractive index portion was cross-linked and cured by ultraviolet ray irradiation using a mercury lamp to form a low refractive index portion, and thereby a louver-type light control layer was obtained.

<Composition for Forming Low Refractive Index Portion>

Transparent acrylic ultraviolet curable prepolymer. 100 parts by mass

1-Hydroxy-cyclohexyl-phenyl ketone (photopolymerization initiator, product name: IRGACURE™ 184, manufactured by BASF Corp.) . . . 1 part by mass (Formation of Second Adhesive Layer and Barrier Layer)

A second adhesive layer and a barrier layer were formed in the same manner as in Example 9.

(Formation of First Adhesive Layer)

A first adhesive layer was formed by using the coating solution N for forming a first adhesive layer.

A light-peel separator film having a reduced silicon-transfer property (film thickness: 38 µm) was laminated on the first adhesive layer and was aged at 40° C. for 3 days to obtain a window film.

Example 22

A window film was obtained in the same manner as in Example 21, except that the coating solution F for forming a first adhesive layer was used. The adhesive force of the first adhesive layer was 15 N/25 mm.

Example 23

A window film was obtained in the same manner as in Example 21, except that the coating solution M for forming a first adhesive layer was used. The adhesive force of the first adhesive layer was 10 N/25 mm.

Comparative Example 5

A window film was obtained in the same manner as in Example 21, except that a second adhesive layer was formed on a light control layer by using the coating solution N for forming a first adhesive layer and a barrier layer and a first adhesive layer were not provided. The adhesive force of the second adhesive layer was 15 N/25 mm.

Comparative Example 4

A window film was obtained in the same manner as in Example 21, except that a second adhesive layer was formed on a light control layer by using the coating solution F for forming a second adhesive layer and a barrier layer and a first adhesive layer were not provided. The adhesive force of the second adhesive layer was 25 N/25 mm.

[Evaluation 2]

(Weatherability Test)

A test for ultraviolet deterioration resistance was performed on each window film of Examples 9 to 23 and Comparative Examples 3 to 6 so as to evaluate appearance and holding power thereof after deterioration.

The test for ultraviolet deterioration resistance was performed by the same method as in Evaluation 1; procedures (A), (B), and (C) were set as one cycle, a plurality of times of cycles each corresponding to 500 hours, 1000 hours (42 cycles), and 1500 hours were performed so as to evaluate the appearance of the test piece after elapse of the time corresponding to each of hours. Further, the holding power was measured for the test piece after 1000 hours. The methods of the appearance evaluation and the holding power evaluation were the same methods as in Evaluation 1.

A case, in which both the appearance evaluation and the holding power evaluation of the test piece after 1000 hours of the test for ultraviolet deterioration resistance were rated as ○, was rated as ○ in comprehensive evaluation, and a case, in which one of the appearance evaluation and the holding power evaluation was rated as X, was rated as X in comprehensive evaluation. Further, a case, in which the appearance evaluation of the test piece after 1500 hours of the test for ultraviolet deterioration resistance was rated as ○, was rated as ⊙ in comprehensive evaluation.

The evaluation results of Examples 9 to 20 and Comparative Examples 3 and 4 are shown in Table 2, and the evaluation results of Examples 21 to 23 and Comparative Examples 5 and 6 are shown in Table 3.

TABLE 2

|  |  | Example 9 | Example 10 | Example 11 | Example 12 | Example 13 |
|---|---|---|---|---|---|---|
| Light control layer | Light transmission portion | Composition A for forming light transmission portion | Composition A for forming light transmission portion | Composition A for forming light transmission portion | Composition A for forming light transmission portion | Composition A for forming light transmission portion |
|  | Light control portion (heat ray absorbing portion) | Composition for forming heat ray absorbing portion | Composition for forming heat ray absorbing portion | Composition for forming heat ray absorbing portion | Composition for forming heat ray absorbing portion | Composition for forming heat ray absorbing portion |
| First adhesive layer | Main agent | Acrylic copolymer B | Acrylic copolymer B | Acrylic copolymer B | Acrylic copolymer B | Acrylic copolymer B |
|  | Curing agent | Isocyanate HDI-based | Isocyanate HDI-based | Isocyanate XDI-based | Isocyanate TDI-based | Isocyanate HDI-based |
|  | Ultraviolet absorbent | Benzotriazole-based C | Benzotriazole-based B | Benzotriazole-based C | Benzotriazole-based C | Benzotriazole-based C |
|  | Light stabilizer | Hindered amine-based | Hindered amine-based A | Hindered amine-based A | Hindered amine-based A | Hindered amine-based A |
|  | Oxidation inhibitor | None | None | None | None | None |
|  | Adhesive force (N/25 mm) | 15 | 15 | 15 | 15 | 15 |
|  | Barrier layer | PET (16 μm) | PET (16 μm) | PET (16 μm) | PET (16 μm) | PET (16 μm) |
| Second adhesive layer | Main agent | Acrylic copolymer B | Acrylic copolymer B | Acrylic copolymer B | Acrylic copolymer B | Acrylic copolymer B |
|  | Curing agent | Isocyanate HDI-based | Isocyanate HDI-based | Isocyanate HDI-based | Isocyanate HDI-based | Isocyanate HDI-based |
|  | Ultraviolet absorbent | None | None | None | None | None |
|  | Adhesive force (N/25 mm) | 25 | 25 | 25 | 25 | 25 |
| Evaluation | Appearance after 500 h | ○ | ○ | ○ | ○ | ○ |
|  | after 1000 h | ○ | ○ | ○ | ○ | ○ |
|  | after 1500 h | ○ | ○ | ○ | ○ | ○ |
|  | Holding power (after 1000 h) | ○ | ○ | ○ | ○ | ○ |
|  | Total | ◎ | ◎ | ◎ | ◎ | ◎ |

|  |  | Example 14 | Example 15 | Example 16 | Example 17 | Example 18 |
|---|---|---|---|---|---|---|
| Light control layer | Light transmission portion | Composition A for forming light transmission portion | Composition A for forming light transmission portion | Composition A for forming light transmission portion | Composition A for forming light transmission portion | Composition A for forming light transmission portion |
|  | Light control portion (heat ray absorbing portion) | Composition for forming heat ray absorbing portion | Composition for forming heat ray absorbing portion | Composition for forming heat ray absorbing portion | Composition for forming heat ray absorbing portion | Composition for forming heat ray absorbing portion |
| First adhesive layer | Main agent | Acrylic copolymer B | Acrylic copolymer B | Acrylic copolymer B | Acrylic copolymer B | Acrylic copolymer B |
|  | Curing agent | Isocyanate HDI-based | Isocyanate HDI-based | Isocyanate HDI-based | Isocyanate HDI-based | Isocyanate HDI-based |
|  | Ultraviolet absorbent | Benzotriazole-based C | Benzotriazole-based C | Benzotriazole-based C | Benzotriazole-based C | Benzotriazole-based C |
|  | Light stabilizer | Hindered amine-based B | Hindered amine-based C | Hindered amine-based D | Hindered amine-based A | Hindered amine-based A |
|  | Oxidation inhibitor | None | None | None | None | None |
|  | Adhesive force (N/25 mm) | 15 | 15 | 15 | 15 | 15 |
|  | Barrier layer | PET (16 μm) | PET (16 μm) | PET (25 μm) | PET (50 μm) | PET (50 μm) |
| Second adhesive layer | Main agent | Acrylic copolymer B | Acrylic copolymer B | Acrylic copolymer B | Acrylic copolymer B | Acrylic copolymer B |
|  | Curing agent | Isocyanate HDI-based | Isocyanate HDI-based | Isocyanate HDI-based | Isocyanate HDI-based | Isocyanate HDI-based |
|  | Ultraviolet absorbent | None | None | None | None | None |
|  | Adhesive force (N/25 mm) | 25 | 25 | 25 | 25 | 25 |
| Evaluation | Appearance after 500 h | ○ | ○ | ○ | ○ | ○ |
|  | after 1000 h | ○ | ○ | ○ | ○ | ○ |
|  | after 1500 h | ○ | ○ | ○ | ○ | ○ |
|  | Holding power (after 1000 h) | ○ | ○ | ○ | ○ | ○ |
|  | Total | ◎ | ◎ | ◎ | ◎ | ◎ |

|  |  | Example 19 | Example 20 | Comparative Example 3 | Comparative Example 4 |
|---|---|---|---|---|---|
| Light control layer | Light transmission portion | Composition A for forming light transmission portion | Composition A for forming light transmission portion | Composition A for forming light transmission portion | Composition A for forming light transmission portion |
|  | Light control portion (heat ray absorbing portion) | Composition for forming heat ray absorbing portion | Composition for forming heat ray absorbing portion | Composition for forming heat ray absorbing portion | Composition for forming heat ray absorbing portion |

TABLE 2-continued

| | | | | | |
|---|---|---|---|---|---|
| First adhesive layer | Main agent | Acrylic copolymer B | Acrylic copolymer B | None | None |
| | Curing agent | Isocyanate HDI-based | Isocyanate HDI-based | None | None |
| | Ultraviolet absorbent | Benzotriazole-based C | Benzotriazole-based C | None | None |
| | Light stabilizer | Hindered amine-based A | None based D | None | None |
| | Oxidation inhibitor | Hindered phenol-based A | None | None | None |
| | Adhesive force (N/25 mm) | 10 | 15 | None | None |
| | Barrier layer | PET (16 μm) | PET (16 μm) | None | None |
| Second adhesive layer | Main agent | Acrylic copolymer B | Acrylic copolymer B | Acrylic copolymer B | Acrylic copolymer B |
| | Curing agent | Isocyanate HDI-based | Isocyanate HDI-based | Isocyanate HDI-based | Isocyanate HDI-based |
| | Ultraviolet absorbent | None | None | Benzotriazole-based C | None |
| | Adhesive force (N/25 mm) | 25 | 25 | 15 | 25 |
| Evaluation | Appearance after 500 h | ○ | ○ | ○ | X |
| | after 1000 h | ○ | ○ | X | X |
| | after 1500 h | ○ | X | X | X |
| | Holding power (after 1000 h) | ○ | ○ | X | X |
| | Total | ⊚ | ○ | X | X |

TABLE 3

| | | Example 21 | Example 22 | Example 23 | Comparative Example 5 | Comparative Example 6 |
|---|---|---|---|---|---|---|
| Light control layer | Light transmission portion | Composition B for forming light transmission portion | Composition B for forming light transmission portion | Composition B for forming light transmission portion | Composition B for forming light transmission portion | Composition B for forming light transmission portion |
| | Light control portion (low refractive portion) | Composition for forming low refractive portion | Composition for forming low refractive portion | Composition for forming low refractive portion | Composition for forming low refractive portion | Composition for forming low refractive portion |
| First adhesive layer | Main agent | Acrylic copolymer B | Acrylic copolymer B | Acrylic copolymer B | None | None |
| | Curing agent | Isocyanate HDI-based | Isocyanate HDI-based | Isocyanate HDI-based | None | None |
| | Ultraviolet absorbent | Benzotriazole-based C | Benzotriazole-based C | Benzotriazole-based C | None | None |
| | Light stabilizer | None | Hindered amine-based A | Hindered amine-based D | None | None |
| | Oxidation inhibitor | None | None | Hindered phenol-based A | None | None |
| | Adhesive force (N/25 mm) | 15 | 15 | 10 | None | None |
| | Barrier layer | PET (16 μm) | PET (16 μm) | PET (16 μm) | None | None |
| Second adhesive layer | Main agent | Acrylic copolymer B | Acrylic copolymer B | Acrylic copolymer B | Acrylic copolymer B | Acrylic copolymer B |
| | Curing agent | Isocyanate HDI-based | Isocyanate HDI-based | Isocyanate HDI-based | Isocyanate HDI-based | Isocyanate HDI-based |
| | Ultraviolet absorbent | None | None | None | Benzotriazole-based C | None |
| | Adhesive force (N/25 mm) | 25 | 25 | 25 | 15 | 25 |
| Evaluation | Appearance after 500 h | ○ | ○ | ○ | ○ | X |
| | after 1000 h | ○ | ○ | ○ | X | X |
| | after 1500 h | X | ○ | ○ | X | X |
| | Holding power (after 1000 h) | ○ | ○ | ○ | X | X |
| | Total | ○ | ⊚ | ⊚ | X | X |

From the results in Table 2 and Table 3, regardless of the type of the light control portion in the light control layer, the window film of each of Examples 9 to 23 including the first adhesive layer containing a weathering agent and the barrier layer provided between the first adhesive layer and the second adhesive layer was excellent in appearance and holding power and exhibited high weatherability even when the test for ultraviolet deterioration resistance was performed for 1000 hours. On the other hand, in the window film of each of Comparative Examples 3 to 6 not including the barrier layer, even in a case which the adhesive layer contained a weathering agent, yellow discoloration and a decrease in holding power were recognized when the test for ultraviolet deterioration resistance was performed.

Further, when Examples 9 to 19 and Examples 22 and 23 were compared with Examples 20 and 21, in the window film of each of Examples 9 to 19 and Examples 22 and 23 in which an ultraviolet absorbent and a photooxidation inhibitor were concurrently used as a weathering agent contained in the first adhesive layer, satisfactory appearance was recognized even after 1500 hours of the test for ultraviolet deterioration resistance. From this finding, it was suggested that weatherability of the window film could be further improved by concurrently using an ultraviolet absorbent and a photooxidation inhibitor as a weathering agent.

REFERENCE SIGNS LIST

1 First adhesive layer
2 Barrier layer
3 Second adhesive layer
4 Light control layer
10 Window film

What is claimed is:

1. A window film comprising at least a first adhesive layer containing a weathering agent, a barrier layer, a second adhesive layer, and a light control layer in this order,
    wherein the second adhesive layer is directly disposed on a surface of the barrier layer, and adheres the barrier layer to the light control layer,
    the second adhesive layer comprises at least one selected from the group consisting of an acrylic adhesive, a silicon-based adhesive, an ester-based adhesive, a urethane-based adhesive, a fluorine-based adhesive, a polyimide-based adhesive, an epoxy-based adhesive, a polyurethane ester-based adhesive, a vinyl acetate-based adhesive, a synthetic rubber-based adhesive, and a natural rubber-based adhesive,
    both of the second adhesive layer and the light control layer do not contain an ultraviolet absorbent,
    the light control layer is a louver-type light control layer or a prism-type light control layer,
    the barrier layer is a single-layer sheet or single-layer film, wherein said single-layer sheet or single-layer film is formed of a resin material and a thickness of said single-layer sheet or single-layer film is in a range from 10 μm to 70 μm, or the barrier layer includes a resin layer and a transparent inorganic compound layer on the resin layer, the resin layer being a single-layer sheet or single-layer film formed of the resin material, and
    the transparent inorganic compound layer is inorganic oxide of Si, Al, or Ti, inorganic nitride, inorganic carbide, inorganic oxycarbide, inorganic carbonitride, inorganic oxynitride, or inorganic oxycarbonitride.

2. The window film according to claim 1, wherein the weathering agent includes an ultraviolet absorbent.

3. The window film according to claim 1, wherein the weathering agent includes an ultraviolet absorbent and a photooxidation inhibitor.

4. The window film according to claim 1, wherein the barrier layer is formed of polyethylene terephthalate.

5. The window film according to claim 1, wherein the light control layer is the louver-type light control layer, including a light transmission portion having a plurality of grooves on one surface of the light transmission portion and light control portions in the grooves.

6. The window film according to claim 1, wherein an adhesive force of the first adhesive layer is equal to or smaller than an adhesive force of the second adhesive layer.

7. The window film according to claim 1, wherein the weathering agent includes a benzotriazole-based ultraviolet absorbent.

8. The window film according to claim 1, wherein a thickness of the first adhesive layer is in a range of 10 μm to 80 μm.

9. The window film according to claim 1,
    wherein the light control layer is the prism-type light control layer and includes a plurality of unit prisms having a trapezoidal cross-section, and
    wherein a space between adjacent unit prisms is filled with air.

10. A window comprising:
    a window glass; and
    a window film disposed on the window glass, the window film comprising at least a first adhesive layer containing a weathering agent, a barrier layer, a second adhesive layer, and a light control layer in this order,
    wherein the first adhesive layer is attached on the window glass;
    the second adhesive layer is directly disposed on a surface of the barrier layer, and adheres the barrier layer to the light control layer,
    the second adhesive layer comprises at least one selected from the group consisting of an acrylic adhesive, a silicon-based adhesive, an ester-based adhesive, a urethane-based adhesive, a fluorine-based adhesive, a polyimide-based adhesive, an epoxy-based adhesive, a polyurethane ester-based adhesive, a vinyl acetate-based adhesive, a synthetic rubber-based adhesive, and a natural rubber-based adhesive,
    both of the second adhesive layer and the light control layer do not contain an ultraviolet absorbent,
    the light control layer is a louver-type light control layer or a prism-type light control layer,
    the barrier layer is a single-layer sheet or single-layer film, wherein said single-layer sheet or single-layer film is formed of a resin material and a thickness of said single-layer sheet or single-layer film is in a range from 10 μm to 70 μm, or the barrier layer includes a resin layer and a transparent inorganic compound layer on the resin layer, the resin layer being a single-layer sheet or single-layer film formed of the resin material, and
    the transparent inorganic compound layer is inorganic oxide of Si, Al, or Ti, inorganic nitride, inorganic carbide, inorganic oxycarbide, inorganic carbonitride, inorganic oxynitride, or inorganic oxycarbonitride.

11. The window according to claim 10,
    wherein the light control layer is the louver-type light control layer, and includes a plurality of louver-shape light control portions and a light transmission portion between adjacent ones of the light control portions, and
    wherein a width of the light control portion close to the window glass is greater than a width of the light control portion far from the window glass in the vertical cross-section view.

* * * * *